(12) United States Patent
Marathe et al.

(10) Patent No.: US 8,417,897 B2
(45) Date of Patent: Apr. 9, 2013

(54) SYSTEM AND METHOD FOR PROVIDING LOCALE-BASED OPTIMIZATIONS IN A TRANSACTIONAL MEMORY

(75) Inventors: Virendra J. Marathe, Florence, MA (US); Mark S. Moir, Windham, NH (US)

(73) Assignee: Oracle International Corporation, Redwood City, CA (US)

( * ) Notice: Subject to any disclaimer, the term of this patent is extended or adjusted under 35 U.S.C. 154(b) by 410 days.

(21) Appl. No.: 12/750,884

(22) Filed: Mar. 31, 2010

(65) Prior Publication Data

US 2011/0246724 A1    Oct. 6, 2011

(51) Int. Cl.
G06F 12/00 (2006.01)
G06F 9/46 (2006.01)

(52) U.S. Cl. .................................. 711/147; 718/101

(58) Field of Classification Search .................... None
See application file for complete search history.

(56) References Cited

U.S. PATENT DOCUMENTS

| | | | |
|---|---|---|---|
| 5,918,005 A * | 6/1999 | Moreno et al. ............... | 714/38.1 |
| 2002/0091899 A1* | 7/2002 | Weedon ....................... | 711/118 |
| 2008/0098374 A1 | 4/2008 | Adl-tabatabai et al. | |
| 2008/0301378 A1 | 12/2008 | Carrie | |
| 2009/0235254 A1* | 9/2009 | Michael ....................... | 718/101 |
| 2009/0235262 A1* | 9/2009 | Ceze et al. ................... | 718/102 |
| 2010/0057740 A1* | 3/2010 | Ni et al. ........................ | 707/8 |
| 2010/0070955 A1 | 3/2010 | Kahlon | |
| 2010/0218195 A1* | 8/2010 | Adl-Tabatabai et al. ..... | 718/107 |
| 2011/0145516 A1* | 6/2011 | Adl-Tabatabai et al. ..... | 711/152 |

OTHER PUBLICATIONS

U.S. Appl. No. 12/634,640, filed Dec. 9, 2009.
U.S. Appl. No. 10/669,948, filed Sep. 24, 2003.
A.-R. Adl-Tabatabai, B. T. Lewis, V. Menon, B. R. Murphy, B. Saha, and T. Shpeisman. Compiler and Runtime Support for Efficient Software Transactional Memory. Proceedings of the ACM SIGPLAN Conference on Programming Language Design and Implementation, pp. 26-37, 2006.
B. Blanchet. Escape Analysis for Object-Oriented Languages: Application to Java. Proceedings of the 14th ACM SIGPLAN Conference on Object-Oriented Programming, Systems, Languages, and Applications, pp. 20-34, 1999.
C. Boyapati, R. Lee, and M. Rinard. Ownership Types for Safe Programming: Preventing Data Races and Deadlocks. Proceedings of the 17th ACM SIGPLAN Conference on Object-Oriented Programming, Systems, Languages, and Applications, pp. 211-230, 2002.

(Continued)

Primary Examiner — Kaushikkumar Patel
(74) Attorney, Agent, or Firm — Robert C. Kowert; Meyertons, Hood, Kivlin, Kowert & Goetzel, P.C.

(57) ABSTRACT

The system and methods described herein may reduce read/write fence latencies and cache pressure related to STM metadata accesses. These techniques may leverage locality information (as reflected by the value of a respective locale guard) associated with each of a plurality of data partitions (locales) in a shared memory to elide various operations in transactional read/write fences when transactions access data in locales owned by their threads. The locale state may be disabled, free, exclusive, or shared. For a given memory access operation of an atomic transaction targeting an object in the shared memory, the system may implement the memory access operation using a contention mediation mechanism selected based on the value of the locale guard associated with the locale in which the target object resides. For example, a traditional read/write fence may be employed in some memory access operations, while other access operations may employ an optimized read/write fence.

20 Claims, 9 Drawing Sheets

OTHER PUBLICATIONS

J.-D. Chi, M. Gupta, M. Serrano, V. C. Sreedhar, and S. Midkiff. Escape Analysis for Java. Proceedings of the 14th ACM SIGPLAN Conference on Object-Oriented Programming, Systems, Languages, and Applications, pp. 1-19, 1999.

D. Dice, N. Shavit, and O. Shalev. Transactional Locking II. Proceedings of the 20th International Symposium on Distributed Computing, pp. 194-208, 2006.

P. Felber, C. Fetzer, and T. Riegel. Dynamic Performance Tuning of Word-based Software Transactional Memory. Proceedings of the 13th ACM SIGPLAN Symposium on Principles and Practice of Parallel Programming, pp. 237-246, 2008.

T. Harris, M. Plesko, A. Shinnar, and D. Tarditi. Optimizing Memory Transactions. ACM SIGPLAN 2006 Conference on Programming Language Design and Implementation, pp. 14-25, Jun. 2006.

M. Herlihy, V. Luchangco, M. Moir, and W. N. Scherer III. Software Transactional Memory for Dynamic-sized Data Structures. Proceedings of the 22nd Annual Symposium on Principles of Distributed Computing, pp. 92-101, 2003.

M. Kulkarni, K. Pingali, G. Ramanarayanan, B. Walter, K. Bala, and L. Chew. Optimistic Parallelism Benefits From Data Partitioning. Proceedings of the 13th International Conference on Architectural Support for Programming Languages and Operating Systems, 2008, 11 pages.

V. J. Marathe, W. N. Scherer III, and M. L. Scott. Adaptive Software Transactional Memory. Proceedings of the 19th International Symposium on Distributed Computing, pp. 354-368, 2005.

T. Riegel, C. Fetzer, and T. Hohnstein. Time-based Transactional Memory with Scalable Time Bases. Proceedings of the 19th ACM Symposium on Parallelism in Algorithms and Architectures, pp. 221-228, 2007.

* cited by examiner

SYSTEM AND METHOD FOR PROVIDING LOCALE-BASED OPTIMIZATIONS IN A TRANSACTIONAL MEMORY

BACKGROUND

1. Field of the Disclosure

This disclosure relates generally to concurrent access to shared objects, and more particularly to a system and method for implementing a transactional memory that exploits locality to improve transactional memory performance.

2. Description of the Related Art

The multi-core revolution currently in progress is making it increasingly important for applications to exploit concurrent execution in order to take advantage of advances in technology. Shared-memory systems allow multiple threads to access and operate on the same memory locations. To maintain consistency, threads must often execute a series of instructions as one atomic block, or critical section. In these cases, care must be taken to ensure that other threads do not observe memory values from a partial execution of such a block. Such assurances are important for practical and productive software development because without them, it can be extremely difficult to manage the interactions of concurrent threads. Traditional constructs, such as mutual exclusion and locks may be used by a thread to ensure correctness by excluding all other threads from concurrent access to a critical section. For example, no thread may enter a critical section without holding the section's lock. While it does, all other threads wishing to execute the critical section must await the lock's release and acquire it before proceeding.

The pitfalls of these constructs are numerous and well known. They include dead-lock, priority inversions, software complexity, and performance limitations. Locking large sections of code and/or code that accesses a lot of data is a heavy-handed approach to concurrency control. A fine-grain locking approach can be more scalable than a coarse-grain approach, but significantly increases programming complexity because the programmer has to acquire and release the correct locks for the correct data, while avoiding deadlocks, composing critical sections for operations at a higher level of abstraction, etc.

Alternatively, it may be possible to increase parallelism by allowing multiple threads to execute a critical section at one time if the executions do not rely on overlapping memory locations. This may increase performance and mitigate many of the pitfalls normally associated with traditional locking mechanisms. However, it may be difficult (if not impossible) and cumbersome to generate code such that interleaved executions are guaranteed to be correct, i.e. that critical sections do not access memory locations in common.

Transactional memory is a mechanism that can be leveraged to enable concurrent and correct execution of a critical section by multiple threads. As typically defined, a transactional memory interface allows a programmer to designate certain sequences of operations as "atomic blocks" and "transactions," which are guaranteed by the transactional memory implementation to either take effect atomically and in their entirety (in which case they are said to succeed, or to be aborted, such that they have no externally visible effect (in which case they are said to fail). Thus, with transactional memory, it may be possible in many cases to complete multiple operations with no possibility of another thread observing partial results, even without holding any locks. The transactional memory paradigm can significantly simplify the design of concurrent programs. In general, transactional memory can be implemented in hardware (HTM), in software (STM), or in any of a variety of hardware-assisted software implementations or other hybrid hardware-software transactional memories (HyTM).

To guarantee atomicity, an STM runtime typically mediates its transactions' shared memory accesses through specialized transactional read/write fences. However, these read/write fences are expensive and introduce significant latencies in the shared memory accesses of STM transactions. Furthermore, these fences can significantly increase cache pressure by accessing special transactional metadata, which may not be co-located with the data objects that are the true target of the transactions' accesses. Such excessive cache pressure is detrimental to the performance of applications that are highly sensitive to program locality. For example, some current transactional memory systems employ ownership records that must be acquired and/or updated in conjunction with accessing shared memory locations. One recent proposal for reducing latency associated with updating transactional metadata (e.g., ownership records) relies on a hierarchical clustering of ownership records. In that proposal, a shared memory space is initially partitioned coarsely into a small number of memory areas, each associated with an ownership record, and conflict detection may be performed on these coarse-grained ownership records. If one or more of these initial partitions becomes a source of conflict, it may be fragmented into two or more finer-grained memory areas, each associated with a finer-grained ownership record. Another recent proposal for reducing latency associated with updating transactional metadata involves the augmentation of transactional metadata (e.g., lock records) with forwarding pointers. In that proposal, the runtime attempts to cluster lock records by atomically adding forwarding pointers to the lock records that point to a common cluster head lock. Subsequently, only these cluster head locks need to be acquired and/or included in a transaction's read and/or write set.

SUMMARY

The system and methods described herein may employ various techniques to reduce STM read/write fence latencies and cache pressure related to STM metadata accesses (e.g., accesses to an ownership record, a read set, a write set, or a conflict counter). In parallel applications that exhibit good thread locality behavior, these techniques may leverage information about thread locality based data partitions (e.g., in systems in which with one or more distinct partitions are owned by a given thread of execution) to forego most of the operations in transactional read/write fences in cases in which transactions predominantly access data from their threads' respective data partitions. In some embodiments, the system may divide a shared memory into one or more thread-owned data partitions (locales) and one or more shared (i.e. unowned) locales.

Each locale may be associated with a respective locale guard (or lguard) whose value reflects the state of the locale. For example, in one embodiment, a locale may transition between the following states: disabled, free, exclusive, and shared, where a free state is a state in which no transactions are currently accessing the locale, a disabled state is a state in which the locale-based optimizations described herein are disabled for the locale, an exclusive state is a state indicating that the transaction that owns the locale is the only transaction currently accessing the locale, and a shared state is a state in which the locale is potentially being accessed by one or more transactions that do not own the locale.

In some embodiments, the system described herein may be configured to execute program instructions comprising code to be completed as an atomic transaction, where the code includes one or more memory access operations to a shared memory accessible to a plurality of concurrently executing transactions (e.g., one comprising a plurality of data partitions, at least some of which are thread-owned). For a given memory access operation of the atomic transaction targeting an object in the shared memory, the system may be configured to implement the memory access operation using one of a plurality of contention mediation mechanisms, wherein selection of the contention mediation mechanism is dependent on the value of the respective locale guard associated with the locale in which the target object resides. For example, a traditional read/write fence may be employed in some memory access operations, while other access operations may employ an optimized read/write fence, dependent on the state of the locale, as reflected by the value of the corresponding lguard.

In some embodiments, if the locale is owned by the atomic transaction accessing the object and if its lguard indicates that the locale is in the exclusive state, the system may be configured to implement the given memory access operation using a contention mediation mechanism that does not rely on collection or modification of transaction-related metadata in conjunction with the given memory access operation, such as an optimized read/write fence, described herein. For example, if the memory access is a read operation, the transaction may access the object without recording the read operation in its read set or validating the read set of the transaction. Similarly, if the memory access operation is a write operation, the transaction may record only the value written to the object (or the old value of the object) but may not collect or record other transaction-related metadata for the write operation. In some embodiments, the transaction may not acquire read or write ownership of the target object if the locale in which it resides is in an exclusive state.

If, on the other hand, the locale is owned by the atomic transaction accessing the object but its lguard indicates that the locale is not in the exclusive state (i.e. if it is in a non-exclusive state), the system may in some embodiments be configured to implement the given memory access operation using a contention mediation mechanism that relies on collection or modification of transaction-related metadata in conjunction with the given memory access operation, such as a traditional read/write fence. For example, if the memory access is a read operation, the transaction may acquire read ownership of the object, may record the read operation in its read set and may validate the read set of the transaction in conjunction with performing the read operation. Similarly, if the memory access operation is a write operation, the transaction may acquire write ownership of the object, may record metadata for the write operation in its write set (along with the value written to the object) and may validate the transaction in conjunction with performing the write operation.

In some embodiments, in response to a transaction other than the atomic transaction that owns a locale indicating its intent to access an object in the locale, the system may be configured to transition the data partition from an exclusive state to a non-exclusive state (e.g., the shared state). In some such embodiments, this transition may include one or more intermediate state transitions (e.g., through a shared-pending state, a free state, and/or a disabled state, and then to the shared state).

In some embodiments, memory access operations of one transaction that target objects in locales owned by other transactions may always be implemented using contention mediation mechanisms that rely on collection or modification of transaction-related metadata (such as read/write fences). In some such embodiments, prior to a transaction accessing an object in a locale owned by another transaction, the system may be configured to force the locale in which the object resides to a shared state (if it is not already in the shared state) prior to the transaction attempting to access the object. Similarly, in some embodiments, prior to a transaction accessing an object in its own locale, if the corresponding lguard indicates that the locale is in a free state or a disabled state, the system may be configured to force the locale to a shared state prior to the transaction attempting to access the object.

Methods for exploiting locality information to improve the performance of transactional memory systems may in various embodiments be provided as program instructions computer-executable to perform the processes described herein. For example, they may be provided as a computer-readable storage medium having stored thereon instructions, which may be used to program a computer system (or other electronic devices) to perform the described processes according to various embodiments. The methods described herein may in various embodiments be applied in software transactional memories (STMs) and/or in some software-hardware hybrid transactional memories (HyTMs).

Figure 1:
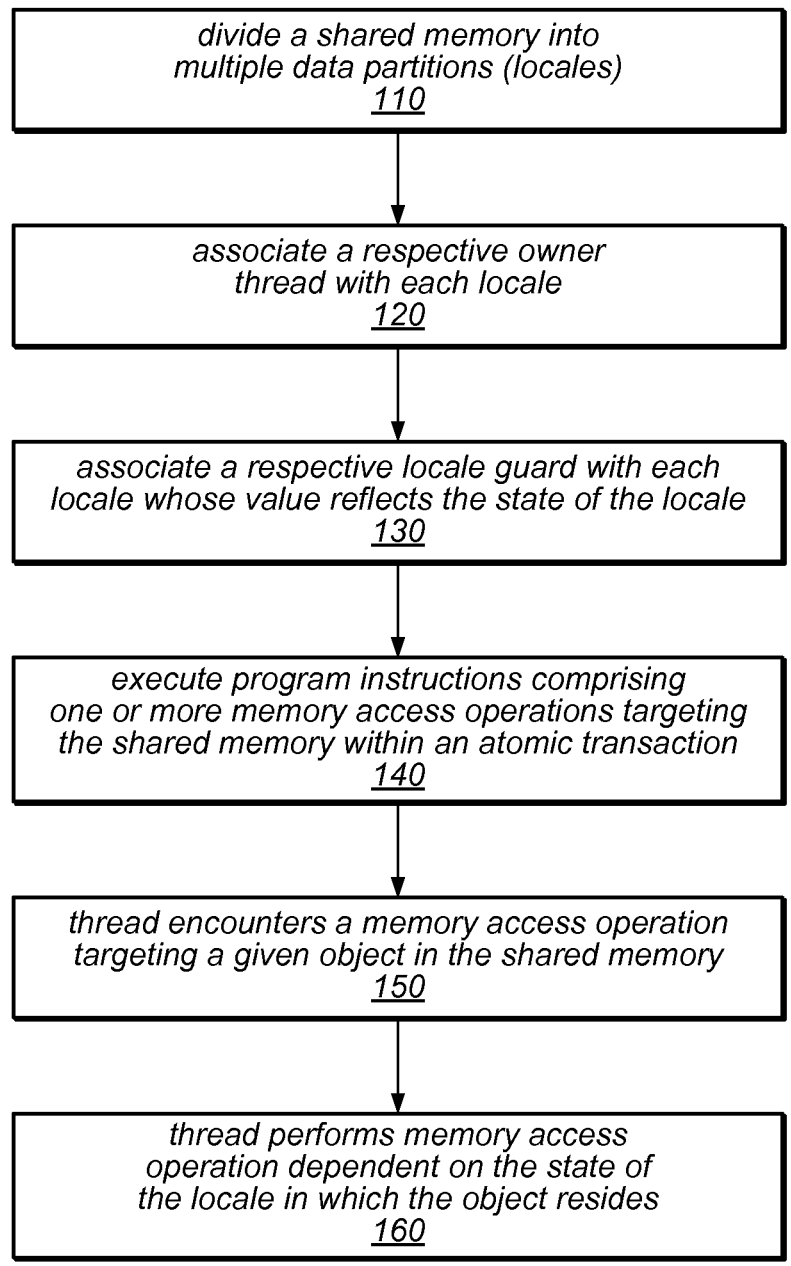
FIG. 1 is a flow diagram illustrating one embodiment of a method for utilizing locale guards to improve performance in a transactional memory, as described herein.

While the disclosure is described herein by way of example for several embodiments and illustrative drawings, those skilled in the art will recognize that the disclosure is not limited to the embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

As used herein, the term transaction may refer to a series of program instructions that may be executed together as an atomic operation. As described above, if the transaction succeeds (i.e. is successfully committed), then any resulting changes to shared memory may become visible to entities other than the entity executing the transaction. If a transaction does not succeed (i.e. is aborted), then the transaction attempt will have caused no change to any shared memory location. Transactional memory runtimes transparently ensure both the atomicity of transactions (i.e. all of the transaction's updates happen altogether, or none of them appear to happen) and isolation (i.e. no intermediate effects of a transaction are visible to any other concurrently executing transactions). In various embodiments, software transactional memories (STMs) and hybrid transactional memories (HyTMs) may guarantee these properties by protecting shared data objects with specialized transactional metadata objects. As used herein, the term "shared data objects" may encompass language level objects as well as fixed-sized, contiguous blocks of memory.

An STM transaction's reads and writes may be executed speculatively (invisible to user code executed by any concurrently executing threads), and may be mediated via the corresponding metadata objects. At the end of its execution, a transaction attempts to commit its speculative updates to the shared memory, in order to make them visible to other threads executing concurrently in the system. The commit phase may typically include several steps: transaction validation (in which it is determined whether the transaction has executed in isolation), logical commit (in which the transaction is logically committed), and cleanup (in which the transaction's speculative updates are made non-speculative, if the transaction commits, or rolled back, if the transaction aborts). The commit phase can succeed only if the transaction is guaranteed to be isolated with respect to other concurrently executing transactions. If the transaction fails to execute in isolation, this may lead to the transaction being aborted. In this case, the transaction's intermediate effects must be rolled back, as if the transaction never executed. In other words, the transaction's speculation is cancelled. In some embodiments, the transaction may be re-tried after the speculative results have been rolled back.

During its execution, a transaction may encounter a conflict with another, concurrently executing transaction. Two active transactions may be said to conflict if they happen to access a common object, and if at least one of those accesses is a write operation. On detecting a conflict, a transaction may be forced to wait for the conflicting transaction to complete (i.e. to commit or abort), or may be able to abort the conflicting transaction to make forward progress. Such decisions may in various embodiments be mediated by a contention management module, also referred to herein as a "contention manager".

Each speculative read and write by a transaction to a shared data object may be mediated by an STM runtime through corresponding metadata object(s). This mediation, sometimes referred to as the transactional read/write fence, may serve as the primary hook for conflict detection among concurrently executing transactions. In some embodiments of STM systems, a transactional fence consists of three parts: (i) acquiring read or write ownership of the shared data object via the corresponding metadata object, (ii) logging shared data and metadata accesses in a transaction's read and write sets, and (iii) validating the current state of the transaction. In some such embodiments, the ownership acquired may be a shared read ownership, or an exclusive write ownership. In various embodiments, read ownership may either be explicit (which may include visible or semi-visible type read ownership), such that each reader transaction modifies the state of the metadata object associated with the target data object to indicate its existence to concurrently executing transactions in the system, or implicit (which may be called invisible read ownership), such that each reader simply snapshots the state of the metadata object for commit time verification that the metadata has not been changed by a concurrently executing transaction during the reader's execution. Explicit ownership acquisition, for both read and writes, is typically done using atomic instructions such as a compare-and-swap (CAS) type operation. In some embodiments, snapshots may also be taken at other intermediate points during the reader's execution. Typically, in most STMs, the reader transaction ensures that the target object is not currently owned by a concurrently executing transaction in write mode. The reader transaction logs the snapshot of the metadata object associated with the object to be read (or at least the identity of the read object) into its read set (a transaction-private data structure that contains a log of all speculative reads done by the transaction) for validation (described in more detail below) and explicit ownership release (if read ownership was explicit) at the end of the transaction.

Acquisition of write ownership may include an atomic update to the metadata object associated with the object to be written (which may happen during the write, sometimes called eager acquisition, or in the commit phase of the writer transaction, sometimes called lazy acquisition). In the process, the writer transaction ensures that the object is not currently owned by any concurrently executing transaction in a conflicting fashion. The writer transaction also logs the write (either the old or the new value of the updated data object) to its write set (another transaction-private data structure). The log serves to either flush out the speculative writes on commit (e.g., in STMs in which speculative writes are buffered in the transaction's write set, also known as the redo log approach), or to roll back the speculative writes on abort (e.g., in STMs in which speculative writes go directly to shared data objects, and the old values are stored in the transaction's write set, also known as the undo log approach).

In its read fence, a transaction may also need to determine if its current read is mutually consistent with its earlier shared memory accesses. For example, two reads by a transaction T can become mutually inconsistent if the data object accessed in the second read was modified by a concurrently executing transaction after the first read by T. Such inconsistent pairs of reads may lead the transaction to interpret two distinct states of the shared memory for a single state, which may in turn lead to incorrect program behavior (e.g., divide by zero exception, null pointer dereferences, etc.). Mutually consistent memory accesses may be especially important for correct behavior of STMs designed for unmanaged languages such as C and C++. Consistency checking of transactions may be performed using a variety of approaches, including through validation of the transaction's read set, or through a constant time check of a special timestamp of just an object being read. Managed languages (such as Java and C#) are equipped to capture exceptional situations such as divide-by-zero errors, and null pointer dereferences, invalid type casts, etc. STMs designed to support these languages may leverage the already available managed infrastructure to "sandbox" the effects of transient inconsistencies in transactions. As a result, these STMs can sometimes forego consistency checks for each read done by the transaction. However, such STMs must periodically validate the entire read set of the transaction to avoid infinite loops resulting from inconsistencies in a transaction. Note that, in general, all STM transactions (with the exception of read-only transactions in some STMs) perform read set validation at least at commit time to ensure isolation. Full read set validation (which is different from the read/write fence validation described herein) may involve iterating over the entire read set to verify that the data objects read by the transaction have not been modified by a concurrent transaction since. Successful validation implies that the transaction executed in isolation and can commit. Failure to validate implies that the transaction may not have executed in isolation, and should abort or be aborted.

Recent work has observed that validation in write fences may be unnecessary. As a result, modern, state-of-the-art STMs, may typically forego validation in the write fence. The read/write fences of typical STM transactions are expensive (e.g., in terms of latency), and may result in significant slowdowns in performance of STM applications. The system and methods described herein may in some embodiments significantly reduce the overhead of STM read/write fences by leveraging thread locality information about the application that uses STM transactions.

The phrase "locality of reference" refers to the general observation that objects in a collection of objects accessed by a computation in the most recent past are likely to be accessed by that computation in the near future. Thread locality, in a sense, is a specialization of the locality of reference concept, in that the accesses of each thread typically belong to a fixed and distinct (from other threads) set of objects in the application. Both traditional and modern computing systems rely heavily on memory caches for good performance. Good locality usually translates to better cache behavior, and consequently may result in better application performance. Locality of reference in general, and thread locality in particular, may be especially beneficial for the performance of parallel applications. As a result, programmers may consider, and may also enforce, good thread locality behavior in the parallel applications they develop. This may include partitioning shared data among concurrent threads, with each thread exclusively "owning" one or more partitions. A data partition owned by a thread may be referred to herein as being in the thread's locale. In addition, the locale of a thread running a transaction T may be referred to herein as transaction T's locale.

For applications that heavily use STM transactions, the STM metadata object accesses and read and/or write set operations within the read/write fences of these transactions may involve a large number of memory accesses to a potentially diverse set of memory locations. This has the potential to significantly disrupt the locality behavior of such applications. Weak locality may lead to extraneous cache misses and shared memory bus traffic, slowing down application performance significantly, in some cases. This can have disastrous consequences in applications where good locality is a dominating performance factor. The systems and methods described herein may include techniques to significantly reduce (or eliminate) the detrimental consequences of STM metadata and read and/or write set accesses (done within STM transactions) on the locality behavior of parallel applications that use STM transactions. In some embodiments, these techniques may significantly improve the overall performance of STM transactions.

Good per-thread data (locale) partitioning may improve performance and scalability of parallel applications in general. STM transactions executed by threads in such applications may, in most cases, access objects only in their respective partitions (locales). The systems and methods described herein may leverage the following observation: for a transaction T that accesses only the objects belonging to its locale, if the STM runtime can guarantee that T is the only transaction accessing its locale's objects at that time, then most of the operations within the read/write fences of T can be elided by the runtime without compromising the isolation of T. In the following descriptions, it is assumed that thread-local data partitions (or locales) may be already provided by an external source (e.g., through language-level annotations inserted by the programmer, by the compiler, by the runtime system, etc.). This partition information may be represented in various ways, in different embodiments, including, but not limited to, the following:

Virtual memory address ranges may be used to represent data partitions. The partitions may in some embodiments be expressed explicitly by the programmer (e.g., by inserting annotations for sub-portions of a large shared array), or may be determined by the runtime system. For example, per-thread memory allocators may be configured to indicate the address ranges of objects allocated by the thread, which may in turn indicate the set of objects most frequently accessed by the thread.

Instances of a specific container type may represent data partitions. In some embodiments, large collections of data (such as hash tables, red-black trees, or other large data structures.) may represent data partitions in systems that employ static (or dynamic) guarantees that there are no overlaps between containers. For instance, ownership types that indicate what objects can be accessed from what reference chains (usually done by forcing each object to be accessible from at most one "owner" object) may be leveraged to identify the objects that belong to each of a plurality of thread partitions.

In some embodiments, escape analysis techniques may enable the compiler to detect whether an allocated object escapes the scope of a code block (or thread). In such embodiments, objects that do not escape the scope of a thread may be considered to belong to the thread's partition (or locale).

As noted above, any of various methods for determining and expressing data partitions may be employed in the systems described herein. Once defined, the systems and methods described herein may use this partition information to elide at least some of the expensive operations typically included within the read/write fences of transactional shared object accesses. To identify whether a transaction is the only one accessing data objects from its locale, the systems and methods described herein may employ a special object called a locale guard (or lguard for short). In some embodiments, each locale may contain an lguard object, indicating the ownership state of the corresponding locale. In some embodiments, the lguard object (hence the corresponding locale) may switch between four ownership states: a free state (which may indicate that no transaction is currently accessing the locale), an exclusive state (which may indicate that the locale's owner transaction is the only transaction currently accessing the locale), a shared state (which may indicate that the locale is potentially being accessed by one or more transactions that do not own the shared locale), and a disabled state (which may indicate that the locale-based optimizations described herein have been disabled for the locale).

In the system described herein, program data may be organized into locales, and these locales may be exploited to optimize performance of transactions that access multiple data items within a given locale. In some embodiments, this may be achieved by optimizing transactional memory operations such that after the first access to a variable (or other object) residing in a given locale, subsequent access to other variables (or objects) in the same locale have lower overhead and cause less cache pressure. Thus, in embodiments in which locales are chosen to reflect the locality of the underlying program, significant performance improvements may be possible. Some examples described herein focus on a single locale per thread that contains its private data (e.g., its stack). However, these methods may be more generally applicable to any data partitions for which various applications exhibit locality. In contrast to some other proposals for reducing overhead in transactional memory accesses, in some embodiments the system described herein does not require that there is no sharing of data (by concurrently executing transactions) in a given locale.

Most existing transactional memory systems treat memory uniformly, and thus are unable to exploit memory access patterns that arise from program behavior. For example, some systems use specific optimizations to reduce the overhead of accessing thread-local data, such as stack data. However, some such systems may behave incorrectly if one thread accesses the stack of another thread. Other such systems may impose restrictions in order to prevent one thread from accessing the stack of another thread. In contrast to these systems, the system and methods described herein may exploit the locality that exists in almost all programs, namely that a thread accesses its own stack frequently, but not the stacks of other threads.

Note that in most STMs, a transaction itself may also transition through several states in its lifetime. For example, in some embodiments, a transaction is initially in an Active state, indicating that it is (still) executing. The transaction may logically commit by switching its state to Committed, or may logically abort by switching its state to Aborted. In some such embodiments, a transition from the Active state to the Committed or Aborted states may be achieved using an atomic instruction, such as a compare-and-swap (CAS) type operation.

FIG. 1 illustrates a method for utilizing locale guards to improve performance in a transactional memory, according to one embodiment. As illustrated at 110 in this example, the method may include dividing a shared memory into multiple data partitions, or locales. As noted above, in various embodiments a shared memory may be divided into any number of thread-local data partitions using language-level annotations, by the compiler, by the runtime system, or by any other means. In some embodiments, a portion of the shared memory may remain un-owned by any thread or transaction, and instead may be considered a shared locale.

As illustrated at 120 in FIG. 1, the method may include associating a respective owner thread (or a transaction thereof) with each data partition (locale). For example, a respective thread (or transaction) may be assigned ownership of each data partition (locale) when the partition is defined (e.g., through annotations, by the compiler, or by the runtime system), or ownership may be assigned at a later time, in various embodiments. As described above, the method may include associating a locale guard (or lguard) with each locale, whose value reflects the state of the locale (e.g., disabled, free, shared, or exclusive). This is illustrated as 130 in FIG. 1.

As shown in this example, the method may include executing program instructions comprising one or more memory access operations targeting the shared memory within an atomic transaction, as in 140. In other words, a thread of execution may perform the operations to implement an atomic transaction that includes memory access operations targeting the shared memory. When the executing thread encounters a memory access operation targeting a given object in the shared memory, as in 150, it may perform the memory access operation in one of several ways, dependent on the state of the locale in which the object resides in the shared memory, as in 160. For example, the access operation may include collecting and/or modifying transaction-related metadata if the object does not reside in a locale owned by the executing thread and/or if the state of the locale in which the object resides is not exclusive to the executing thread.

Figure 2:
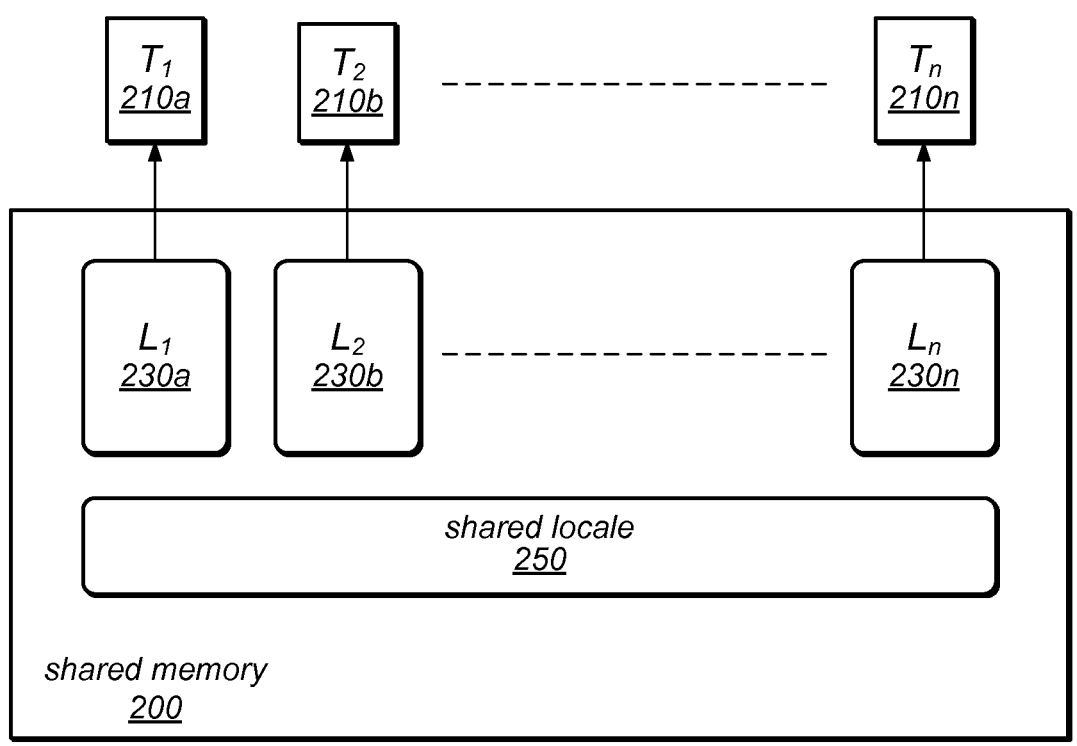
FIG. 2 is a block diagram illustrating the result of partitioning a shared memory into a plurality of thread-local data partitions and a globally shared locale 250, according to one embodiment.

FIG. 2 illustrates the result of partitioning a shared memory 200 into a plurality of thread-local data partitions (locales) 230a-230n, and a globally shared locale 250, according to one embodiment. In this example, each locale $L_i$ is owned by a respective thread $T_i$. In this example, the globally shared locale 250 is not owned by any thread (or transaction thereof), and transactional accesses to it may always be mediated using traditional STM read/write fences, as described above. As described in more detail herein, one or more expensive (i.e. in terms of latency) read/write fence operations of transactional accesses to objects in thread locales $L_1$-$L_n$ may be bypassed by the STM runtime using the methods described herein. In various embodiments, the shared locale 250 may be determined statically (e.g., by defining one or more virtual memory address ranges) or dynamically (e.g., by relocating objects into a shared heap during garbage collection).

Figure 3:
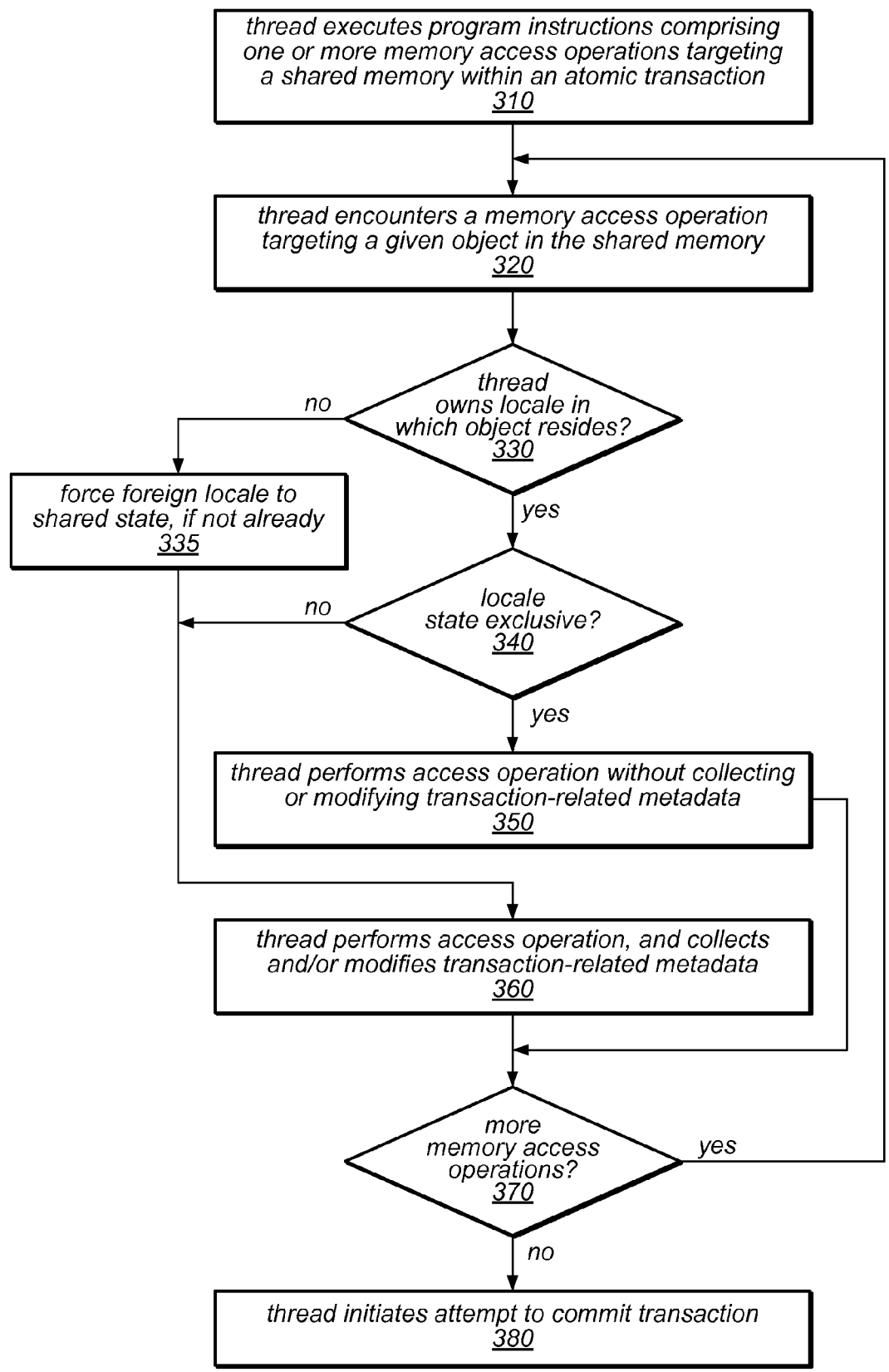
FIG. 3 is a flow diagram illustrating one embodiment of a method for leveraging locale guard state information to elide read/write fence operations, as described herein.

As noted above, in some embodiments, the system may be able to apply optimizations to the typical set of read/write fence operations that leverage the locale guard (lguard) state information associated with a locale in which the object of a memory access operation resides. In some embodiments, these optimizations may be applied only when the lguard of the locale is in the exclusive state. In some such embodiments, these optimizations may be applied only to accesses targeting objects residing in an exclusive locale owned by the transaction that includes the memory access operation. This is described in more detail by way of the example illustrated in FIG. 3. As shown at 310 in this example, a method for leveraging lguard state information to elide read/write fence operations may include a thread executing program instructions comprising one or more memory access operations targeting a shared memory within an atomic transaction. In this example, when the thread encounters a memory access operation targeting a given object in the shared memory, as in 320, the method may include determining whether the thread owns the locale in which the object resides, as in 330. If not, shown as the negative exit from 330, the method may include forcing the locale in which the object resides (denoted in this example as the "foreign locale") to the shared state, if it is not already in the shared state. This is illustrated in 335 in FIG. 3 and explained in more detail later. In this example, after forcing the foreign locale to the shared state, the method may include the thread performing the access operation targeting the given object and collecting and/or modifying transaction-related metadata, such as one or more of: a read set, a write set, an ownership record, a conflict counter, or any other transaction-related metadata, as in 360.

If the thread owns the locale in which the object resides, shown as the positive exit from 330, the method may include determining if that locale is in the exclusive state, as in 340. In other words, the method may include checking the value of the lguard associated with that locale to determine whether its value indicates that the locale is in the exclusive state. If so, shown as the positive exit from 340, the method may include the thread performing the access operation targeting the given object without collecting or modifying all of the transition-related metadata typically employed in a software transactional memory to manage contention between concurrently executing transactions, such as read or write set information, ownership records, conflict counters, etc., as in 350. For example, in some embodiments, the number of accesses to such metadata performed for a given memory access operation may be reduced or eliminated if the targeted object resides in a locale that is owned by the accessing transaction and is in the exclusive state. If the locale is not in the exclusive state, shown as the negative exit from 340, the method may include the thread performing the access operation targeting the given object and collecting and/or modifying transaction-related metadata typically employed in software transactional memories, such as one or more of: a read set, a write set, an ownership record, a conflict counter, or any other transaction-related metadata. Note that at 350, since the locale is owned by the thread and is not in the exclusive state, it may be assumed to be in the shared state, in this example.

If there are more memory access operations encountered by the thread, shown as the positive exit from 370, the operations illustrated in 320-360 may be repeated for these additional memory access operations. This is shown as the feedback from the positive exit of 370 to 320. Note that in this example, various memory accesses included in the atomic transaction may be handled differently by the thread executing the atomic transaction. For example, memory accesses targeting objects in a locale that is owned by the thread executing the atomic transaction and that is in the exclusive state may be performed without collecting or modifying all of the transition-related metadata typically employed in a software transactional memory to detect and/or manage contention between concurrently executing transactions. Other memory accesses of the same atomic transaction may target objects residing in locales that are not owned by the thread executing the atomic transaction and/or that are not in the exclusive state (i.e. that are in a non-exclusive state). These memory access operations may include additional operations to collect and/or modify transactional metadata, as described herein. In this example, once all of the memory access operations of the atomic transaction have been handled, shown as the negative exit from 370, the method may include the thread initiating an attempt to commit the atomic transaction, as in 380. Note that the commit operation may include different operations, in different embodiments, e.g., the type and number of operations within a commit phase may be dependent on the type of read validation, conflict detection mechanisms and/or conflict management mechanisms that are supported in the transactional memory system, and/or on whether the transactional memory system includes hardware support for read validation and/or commit operations.

As noted above, the system and methods described herein may leverage lguard state information to improve the performance of a transactional memory. For example, a method for leveraging lguard state information to elide expensive read fence operations may be illustrated by the example pseudo code below, according to one embodiment. This pseudo code illustrates program instructions that may implement a 32-bit read operation ("Read32") in an embodiment in which the read operation grants a caller transaction read-only access to the target object. This example pseudo code includes a fast path and "slower" path of the Read32 operation, and assumes that the state of myLocale is already known to be exclusive or shared. These are expected to be the common case control flow paths in an application that can benefit from the locale-based optimizations described herein. In this example, the Read32 method calls a method ("enableLocale") that attempts to switch the caller transaction's locale (in this example, "myLocale") to the free state.

```
Word Read32 (Location l, Transaction t)
    Locale myLocale = locale(t)
    if (locale(l) = = myLocale)
        // fast path, in the case that myLocale is in Exclusive state
        if (myLocale.isExclusive( ))
            return optimizedRead32(l, t)
        endif
        // slower path,in the case that myLocale is in Shared state
        if (myLocale.isShared( ))
            return traditionalRead32(l, t)
        endif
        // slowest path; first switch myLocale to Shared or
        // Exclusive state, and then call the appropriate Read32( )
        if (myLocale.isDisabled( ))
            //switch my Locale to the Freestate
            enableLocale(myLocale)
        endif
```

In some embodiments, if the locale in which a target object resides is not in the exclusive or shared state, the methods described herein may include a transaction switching the locale to the exclusive or shared state before doing anything else, as part of an additional ("slowest") path. This path is illustrated by way of the example pseudo code below. Note that in some embodiments, an lguard may transition from the exclusive to the shared state via an additional "shared-pending" state. In some such embodiments, any transaction can transition an exclusive lguard to the shared-pending state, but only the lguard's owner transaction can transition the lguard from shared-pending to the shared state. The shared-pending state, which is included in this example pseudo code, is described in more detail later.

```
If (myLocale.isSharedPending( ))
    // some concurrent transaction has requested shared
    // access to myLocale; so grant the request
    // first conservatively abort because t may have already
    // accessed objects in myLocale in the optimized
    // fashion, which may be incompatible with traditional
    // transactional fences that will be used by concurrent
    // transactions to access objects in myLocale
    abortTransaction(t)
    //then switch myLocale to Shared state
    myLocale.state = Shared
    // lastly throw exception to indicate that was aborted
    throw Aborted( )
endif
if (myLocale.isFree( ))
    if (shouldMakeExclusive(myLocale))
        // attempt to switch myLocale to Exclusive state
        // this should be done atomically in case others are
        // also attempting to change the state
        CompareAndSwap(myLocale.state, Shared, Exclusive)
    else
        // switch myLocale to Shared state
        // no need for an atomic change here
        myLocale.state = Shared
    endif
endif
// at this point, myLocale is either in Shared or Exclusive state
if (myLocale.isShared( ))
    traditionalRead32(l, t)
```

```
    else
        optimizedRead32(l, t)
    endif
else
    Locale foreignLocale = locale(l)
    // make sure that the foreign locale is in Shared state
    // before doing anything else
    forceLocaleToShared(foreignLocale, t);
    traditionalRead32(l, t);
endif
```

It has been observed that memory accesses within transactions in many (if not most) applications are predominantly read operations. Thus it can be argued that the expensive read fences in transactional read operations contribute to most of the overhead in STM transactions, for such applications. As noted above, the read fence may include the following three steps: ownership acquisition, read set logging, and validation. The system and methods described herein may either partly or entirely eliminate all of these steps from the read fence, reducing it to a much cheaper, locality-aware alternative read fence (also referred to herein as an "optimized read fence") than the traditional STM read fence implementations described above. The use of locale state information to select whether to perform an optimized read fence or a traditional read fence for a given memory access operation is described in more detail by way of the examples that follow. As described herein, locale state information may be used to select one of a plurality of contention mediation mechanisms (e.g., a traditional read/write fence or an optimized read/write fence) to be applied to the given access operation.

In some embodiments, a transaction T reading an object O in its exclusive locale may do so in an efficient manner, as follows: T first determines if O belongs to its locale. In some embodiments, this determination may be as simple as checking to see if O belongs to a specific address range that delineates T's locale, or the compiler statically detecting that O belongs to T's locale. After T determines that O is in its locale, it may simply read O, and then verify that the state of its locale has not changed. The first part of the example pseudo code above depicts the fast path for the Read32 operation, in which the target object belongs to the transaction's locale. In this example, the implementation of the read fence eliminates several significant sources of overhead experienced in traditional STM read fences. First, it does not access per-object metadata to identify the ownership state of the object (which, in some existing STM implementations might cause a transaction to access an extra cache line when accessing some data objects). Second, it does not perform any read set logging. This not only reduces the critical path length of the transaction, but may also eliminate accesses to extra cache lines corresponding to the read set of the transaction. In various embodiments of the system described herein, the only set of extra locations accessed by the optimized read fences are the locations (if any) used to identify the transaction's locale boundaries, and the location used to represent the locale's state. Validation of the read operation done by the transaction may boil down to a single check of the locale's state after reading the locale object. In several other STMs, validation requires two checks, one before and one after the read of the object. The traditional and optimized versions of a Read32 operation are illustrated by the example pseudo code below, according to one embodiment. In this example, it is assumed that the STM employs an undo log approach for write operations, such as that described above.

```
Word traditionalRead32(Location l, Transaction t)
    while (true)
    do
        STM_MetaData m
        // get metadata of the object
        m = getSTM_MetaData(l)
        if (Unowned(m))
            // get the value at location l
            Word value = l.value
            // log object and metadata state in the transaction's
            // read set
            t.readset.logRead(l, m)
            // verify that
            if (m = = getSTM_Metadata(l))
                // validate this read
                t.validate( )
                //done
                return value
            endif
        else
            if (owner(m) = = t)
                // already owned the object in read-write mode;
                // since this is an undo log implementation, simply
                // return the location's contents
                return l.value
            else
                // resolve conflict here
                ...
            endif
        endif
    done
Word optimizedRead32(Location l, Transaction t)
    return l.value
```

In applications in which transactions typically access objects only from their own locales, the use of the optimized read fences described herein may result in significantly improved performance as compared to the performance of the same application using traditional STM read fences. In some embodiments, to support applications in which transactions access objects belonging to foreign locales, the system and methods described herein may fall back to a more traditional STM read fence approach when implementing those accesses to objects in foreign locales. Changing the selection of the read fence type to be employed for particular transactional accesses may be done in at least the following two ways.

In some embodiments, when a transaction T determines that its read of object O will cross over to a foreign locale l, T may first make sure that l's state is shared. Thereafter, T can read O using a traditional read fence. In some embodiments, T may have to first abort itself, switch its own locale's state to shared, and then perform all reads in its new incarnation using traditional read fences. However, in some embodiments, a more efficient strategy for some applications may be for T to continue executing without aborting. In such embodiments and for such cases, T may continue to use the optimized read fence for read operations targeting objects in its exclusive locale, and may use traditional read fences for any read operations targeting an object in a foreign locale.

In some embodiments, when the locale l of a transaction T switches from the exclusive state to the shared state (e.g., when it is switched to the shared state by a concurrently executing transaction intending to access objects from T's locale), T may have to abort. This is because T may have no way of validating its read set (which does not contain any entries for objects belonging to l) to ensure isolation. In such embodiments, after aborting T, if l is still in the shared state, T's new incarnation may use traditional read fences for all its shared object reads. This means that T may also participate in l's shared state maintenance protocol, which may involve manipulating a shared counter, a reader-writer lock, a non-zero indicator, etc.

Figure 4:
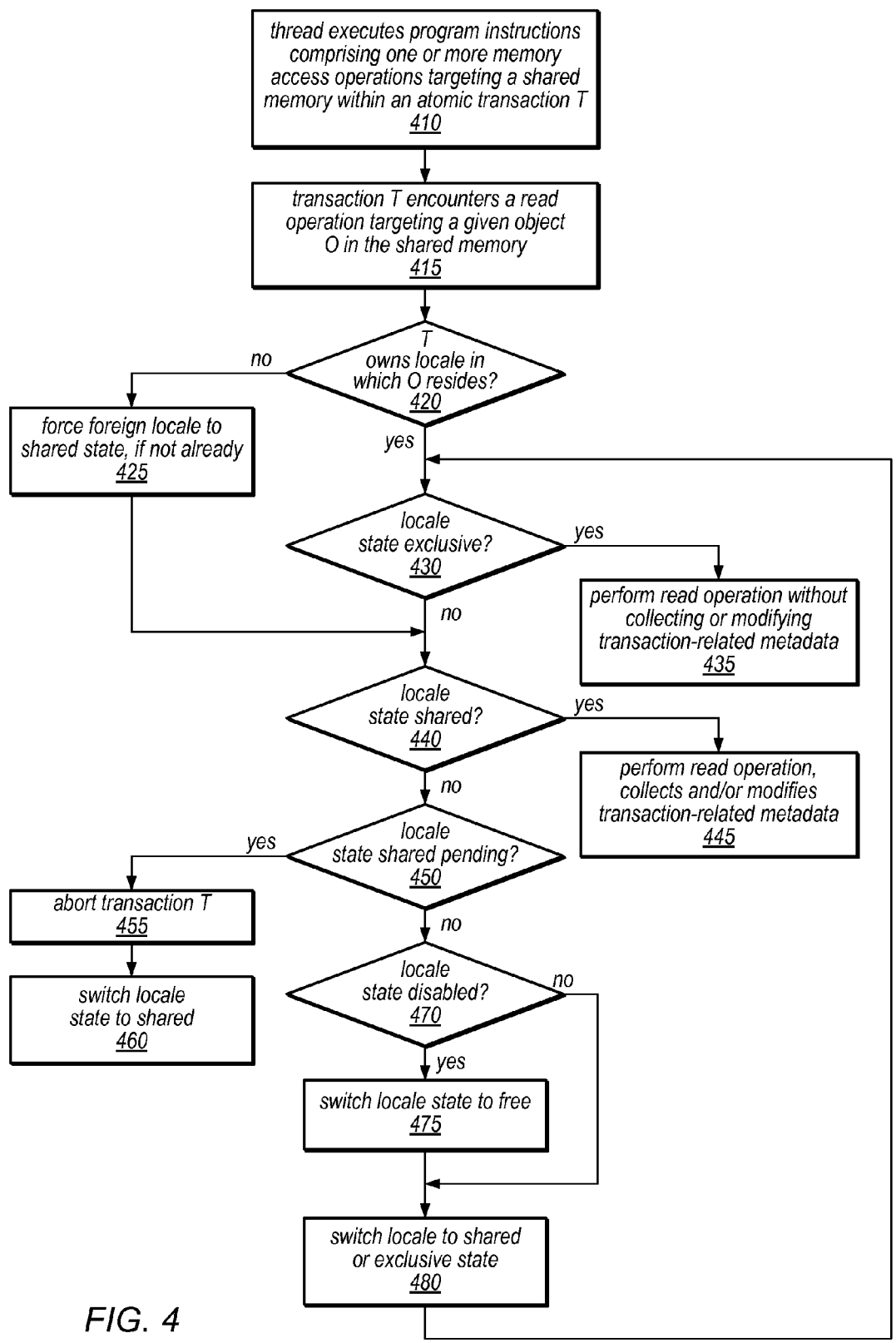
FIG. 4 is a flow diagram illustrating one embodiment of a method for performing a transactional read access operation targeting an object in shared memory that utilizes locale state information to elide read fence operations, as described herein.

FIG. 4 illustrates a method for performing a transactional read access operation targeting an object in shared memory that utilizes locale state information to elide read fence operations, according to one embodiment. In this example, the value of a locale guard, or lguard, may indicate one of five states: free, disabled, exclusive, shared, or shared-pending. As illustrated in this example, the method may include a thread executing program instructions comprising one or more memory access operations targeting objects in a shared memory within an atomic transaction T, as in 410. In this example, if transaction T encounters a read operation targeting an object O in the shared memory (as in 415), the method may include determining whether T owns the locale in which O resides, as in 420. If not, shown as the negative exit from 420, the method may include forcing the foreign locale in which O resides to the shared state, if it is not already in the shared state. This is illustrated at 425 in FIG. 4 and described in more detail later (according to one embodiment).

If T owns the locale in which O resides, shown as the positive exit from 420, the method may include determining the state of the locale in which O resides. For example, in some embodiments, the method may include reading the value of the locale guard (lguard) associated with the locale in which O resides. If the value indicates that the locale is in the exclusive state, shown as the positive exit from 430, the method may include performing the read operation without collecting or modifying all (or in some cases, any) of the transition-related metadata typically employed in a software transactional memory to detect and/or manage contention between concurrently executing transactions, as in 435. If the value indicates that the locale is in the shared state, shown as the positive exit from 440, the method may include performing the read operation, and collecting and/or modifying transaction-related metadata for transaction T and/or this particular read operation, as in 445.

As illustrated in FIG. 4, if the locale in which O resides is in the shared-pending state, shown as the positive exit from 450, the method may include aborting transaction T (as in 455) and switching the state of the locale in which O resides to shared, as in 460. In this example, the fact that the locale in which object O resides is in the shared-pending state may indicate that another transaction wishing to access object O has transitioned the state of the locale in which O resides from exclusive to shared-pending, as described herein. As illustrated in FIG. 4, if the locale in which O resides is in the disabled state, shown as the positive exit from 470, the method may include switching the state of the locale to the free state, as in 475, and then to the shared or exclusive state, as in 480, before continuing. Similarly, if the locale in which O resides is already in the free state (which may be indicated by the fact that it is not in the exclusive, shared, shared-pending, or disabled state, in this example), the method may include switching the state of the locale to the shared or exclusive state, as in 480. In either of these last two cases, the method may include performing an optimized read operation (such as that illustrated in 435) or a traditional STM read operation (such as that illustrated in 445) depending on whether the state of the locale was switched to the shared state or the exclusive state. This is illustrated in FIG. 4 as the feedback from 480 to 430, the path through 430 and 435, and the alternative path through 430, 440, and 445, in this example.

Like the traditional read fence, the traditional STM write fence may include at least two steps: ownership acquisition (which may happen at the time of the write, or as a part of the transaction commit protocol, in various embodiments), and write set logging (in which either the old or the new values of the objects being modified is logged in the transaction's write set) The example pseudo code below illustrates both traditional and optimized versions of a Write32 operation for an STM that employs an undo log approach for write operations, such as that described above. Note that in this example, the STM is equipped with an additional "exclusive-locked" state for locales, which may make elision of ownership acquisition possible in the optimized version of Write32. This exclusive-locked state is described in more detail below.

```
traditionalWrite32(Location l, Transaction t, Word value)
    while (true)
    do
        STM_MetaData m
        // get metadata of the object
        m = getSTM_MetaData(l)
        if(Unowned(m))
            // acqire ownership of l
            if(m.setOwner(t))
                // t is the new owner of l
                t.undolog.logOldValue(l)
                l.value = value
                return
            endif
        else
            if(owner(m) = = t)
                // already owned the object in read-write mode;
                t.undolog.logOldValue(l)
                l.value = value
                return
            else
                // resolve conflict here
                ...
            endif
        endif
    done
optimizedWrite32(Location l, Transaction t, Word value)
    t.undolog.logOldValue(l)
    l.value = value
```

Due to the step-wise similarities between read fences and write fences, one might assume that write fence operations can be elided in a way similar to read fence operations. However, this is not the case. One crucial difference between read and write fences is in the way the logging step functions in each of these operations. In a read fence, the current state of the metadata associated with an object that is read is logged in the transaction's read set. In a write fence, both the metadata and the value of the object (i.e. the old value or the new value, depending on whether the STM employs an undo log or redo log write set implementation, respectively) are logged in the transaction's write set. Logging values of objects in the write set enables a rollback in case the transaction aborts. As a result (and as illustrated in the example pseudo code above) for a transaction writing to an object in its exclusive locale, the corresponding optimized write fence may log the old or new value of an object being modified to support the rolling back of the transaction's results in the case that the transaction fails to commit, but may not need to log or modify any other metadata typically accessed in a traditional write fence.

A traditional STM read/write fence implementation typically enables transaction conflict detection in part by forcing each transaction to check whether the currently accessed object is owned by another, concurrently executing transaction in a conflicting fashion (causing a read-write or write-write conflict). The systems and methods described herein may need to support such conflict detection among locale owner transactions and other concurrently executing transactions. As a result, in some embodiments, the write fence may not forego the ownership acquisition operation for transactions writing to objects in their exclusive locales. A variant of a method for implementing an optimized write fence, i.e. one that precludes ownership acquisitions of objects in a transaction's locale altogether, is described in more detail below, according to one embodiment.

Figure 5:
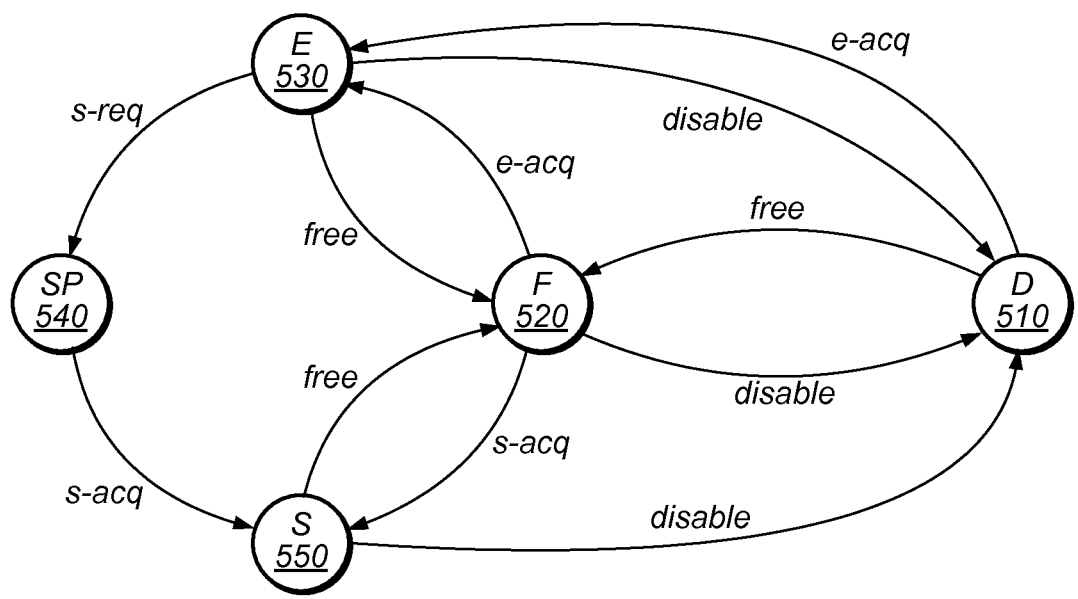
FIG. 5 is a state transition diagram depicting transitions between various locale states, according to one embodiment.

Various embodiments of the system and methods described herein may impose different restrictions on the state transitions of lguards. In some embodiments, each lguard may be initialized to either the disabled or the free state. In some embodiments, a disabled lguard may be enabled by the owner of the corresponding locale by switching the lguard to the free state. In other embodiments, the owner may switch its disabled lguard directly to the exclusive state or the shared state based on dynamic (e.g., profiling based) information or static (e.g., escape analysis based) information. In some embodiments, only the owner transaction can transition its lguard from the free state to the exclusive state or the disabled state, but any transaction can transition an lguard from the free state to the shared state. In some embodiments, the lguard can transition from the exclusive state to the shared state via the shared-pending state described herein. In some such embodiments, any transaction can transition an lguard in the exclusive state to the shared-pending state, but only the lguard's owner transaction can transition the lguard from the shared-pending state to the shared state. This is illustrated in FIG. 5 (described below), and in the example pseudo code for Read32 above. In other embodiments, only the owner transaction can directly transition an lguard from the exclusive state to the free or the disabled states, but any transaction can transition an lguard in the exclusive state to the shared state. In still other embodiments, the owner may be the only transaction that can transition an lguard from the exclusive state to any other state.

As previously noted, the owner transactions of locales for which the corresponding lguard is in the exclusive state may elide several operations in the read/write fences on accesses to data objects within their respective locales. The resulting, more efficient, locale object accesses (such as those including the optimized read fences and/or write fences described above) may be incompatible with traditional STM object accesses that rely on expensive read/write fences for correctness. As a result, in systems that support locale-based optimizations, the STM runtime may take special care to coordinate the lguard state transitions performed by the owner transaction and by other transactions.

In some embodiments, the owner transaction cannot transition a shared lguard to any other state. In such embodiments, it may be the responsibility of the other transactions executing concurrently in the system to carefully transition the shared lguard to the free state. As previously noted, the shared state of an lguard l may indicate that at least one non-owner transaction may be accessing objects in the locale guarded by l (i.e. in l's locale). To be able to switch l to the free state, l must have some kind of an indicator that informs the runtime that there is no non-owner transaction accessing l's locale. This may be accomplished in different ways in different embodiments, including, but not limited to, through the use of shared counters (for non-owner accessor transactions), reader-writer locks (where non-owners act as the readers), and non-zero indicators (where the non-owners can set/reset the indicator, indicating whether there exists a non-owner accessing objects in l's locale). In some embodiments, the owner of a shared lguard l can switch it to the free state. In some such embodiments, the owner transaction may need to participate in the shared state maintenance protocol of l. In other words, the owner may need to perform the locale sharing indicator manipulations mentioned above.

In some embodiments, a thread may maintain exclusive ownership of a locale (even across multiple transactions), by not changing its status when a transaction completes. In some such embodiments, a subsequent transaction executed by the same thread may simply confirm that the status is still exclusive and proceed. Note, however, that this may pose a challenge because, as described so far, if a transaction executed by a thread $T_1$ wishes to access a locale that is owned exclusively by a thread $T_2$ that is not currently executing a transaction, $T_1$ would have to wait until $T_2$ relinquishes ownership of the locale, which it would not do until the next time it executes a transaction. However, there may be no guarantee that it will do so soon, or ever. A similar problem and a solution involving the use of Quickly Reacquirable Locks (QRLs) are described in co-pending U.S. patent application Ser. No. 10/669,948, whose inventors are Dice, Moir, and Scherer. In some embodiments, the QRL techniques described therein may be integrated into the system described herein to allow $T_1$ to revoke $T_2$'s exclusive ownership of a locale, even without $T_2$ executing another transaction.

A state transition diagram depicting transitions between various locale states, as described herein, is illustrated in FIG. 5, according to one embodiment. In this example, D (state 510) represents the disabled state, F (state 520) represents the free state, E (state 530) represents the exclusive state, S (state 550) represents the shared state, and SP (state 540) represents the shared-pending state. In this example, a locale in state exclusive (530) transitions to state shared (550) via the state shared-pending (540), as described herein. In this example, a locale in state shared (550) cannot transition directly to the exclusive state, but must first transition to the disabled state (510) and/or the free state (520). Similarly, a locale in state disabled (510) cannot transition directly to the shared state (550), but must first transition to the free state (520), or to the exclusive state (530) and then to the shared-pending state (540) or free state (530). In this example, the label e-acq denotes a transition to exclusive state (i.e. "exclusive state acquisition"), the label s-req denotes the transition to the shared-pending state (i.e. "shared state requested"), the label s-acq denotes a transition to shared state (i.e. "shared state acquisition"), the label free denotes a transition to free state, and the label disable denotes a transition to disabled state. These transitions may in some embodiments include the modification of the value of the corresponding lguard using an atomic operation (e.g., a CAS type operation), as described in various examples herein.

As noted above, the disabled state of an lguard may indicate that locale-based optimizations for the corresponding locale are turned off. Because of this, all transactions use the traditional STM read/write fences to access objects from a disabled locale. In some embodiments, a transaction T can enable locale-based optimizations on its locale only after switching its locale l's state to exclusive. However, during this switch, there may be other concurrently executing transactions accessing objects in l, and there may be no way to tell what transactions are actually accessing l at the time. Furthermore, after l switches to the exclusive state, T's accesses to l's objects will bypass most of the transactional metadata collection and/or modification operations typically included in read/write fences, making these accesses incompatible with concurrent read/write fence based accesses by other transactions to the same objects. In such embodiments, after switching l's state to exclusive, T may have to wait for all concurrently executing transactions to complete execution. Note that this waiting may only be necessary during the transition from the disabled state to the exclusive state, and may not be necessary during the transition from the free state to the exclusive state (which is expected to be the common case, in many systems). Note, however, that T may not have to wait for transactions that begin execution after T switches l to the exclusive state. In some embodiments, the system may provide a way for the runtime system to identify this (e.g., using transaction timestamps in timestamp-based STMs) and this waiting time may be trimmed down significantly, in some cases. In other embodiments, the system may provide a way to precisely identify the set of transactions accessing l at any given time. For example, in some embodiments, each transaction may maintain a list of locales it has accessed thus far. In such embodiments, T may use these lists to determine the set of transactions for which it needs to wait before beginning execution.

In some embodiments, T may change l from disabled to free state, and thereafter may attempt to switch l to the exclusive state. The example pseudo code below may be used to switch a transaction T's locale l from disabled to free state, according to one embodiment.

```
enableLocale(Transaction t, Locale myLocale)
    // take snapshot of all currently executing transactions
    SnapshotOfTransactions snap = snapshotTransactions( )
    // now switch myLocale to the "free" state
    myLocale.state = free;
    // now wait for all transactions from the snapshot to finish
    waitForSnapshottedTransactionsToComplete(t, snap)
```

Figure 6:
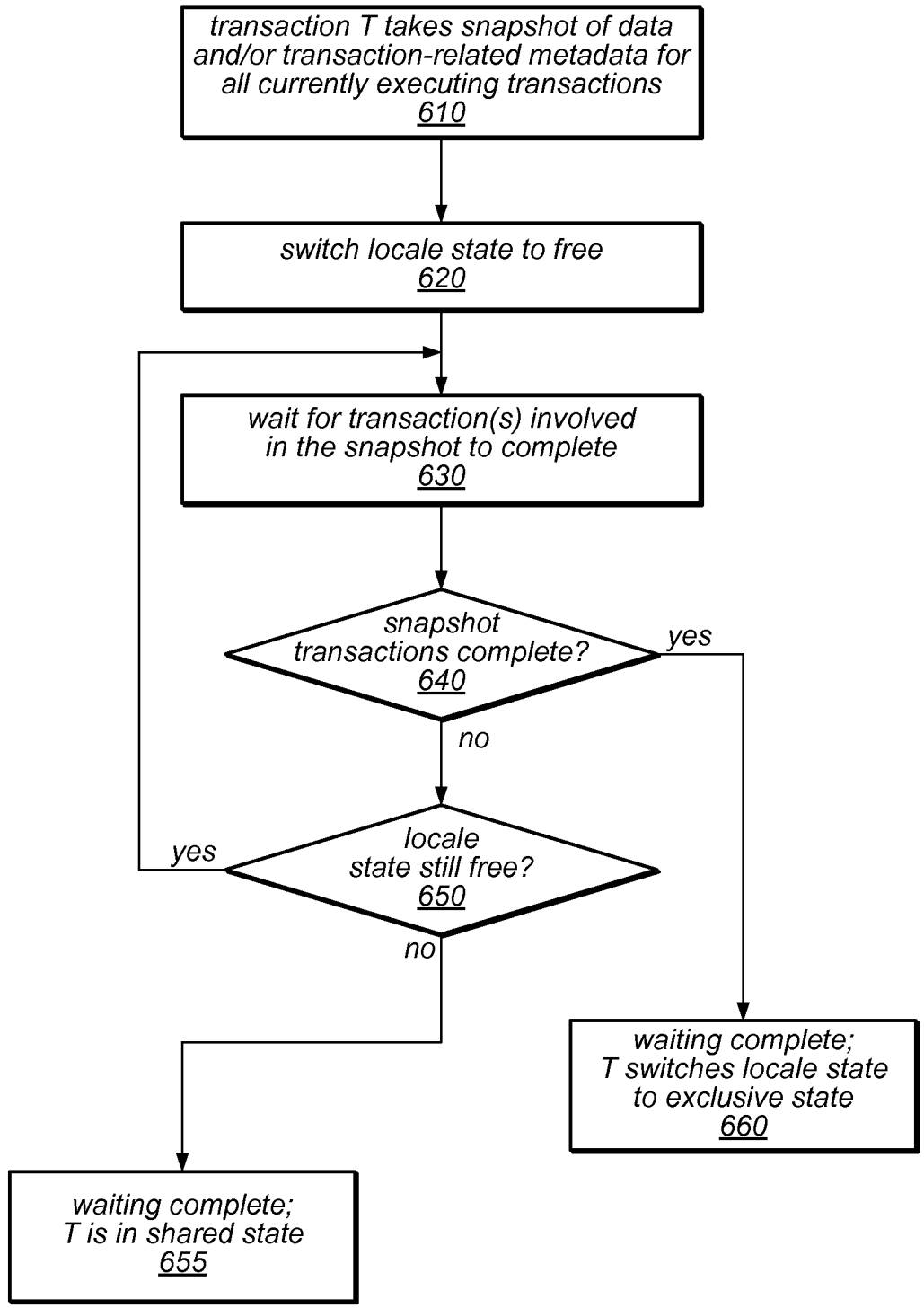
FIG. 6 is a flow diagram illustrating one embodiment of a method for a transaction to change the state of a locale from disabled to free, and then to exclusive, as described herein.

A method for a transaction T to change the state of a locale from disabled to free, and then to exclusive is illustrated in FIG. 6. As illustrated in this example, the method may include transaction T taking a snapshot of data and/or transaction-related metadata for all currently executing transactions, as in 610. The method may include switching the locale state to free, as 620. As described above, the method may include waiting for all of the transactions involved in the snapshot (i.e. all those transactions for which data and/or transaction-related metadata were captured by the snapshot) to complete before continuing, as in 630. In other words, until all of the transactions involved in the snapshot have completed, the operations illustrated in 640 and 650 may be repeated as the transaction T waits for their completion. This waiting is illustrated in FIG. 6 by the feedback loop from the positive exit of 650 to 630. Once all of the transactions involved in the snapshot have completed, shown as the positive exit from 640, the waiting is complete and the method may continue with transaction T switching the locale state to exclusive, as in 660. Note that in some embodiments, while transaction T waits for all concurrently executing transactions to complete execution, l's state may have been switched from free to shared by a concurrently executing transaction. In this case, T cannot switch l's state back to exclusive, and T's waiting may be terminated immediately, leaving l in the shared state. This is illustrated in FIG. 6 at 650 and by the path from the negative exit of 650 to 655.

As previously noted, in a parallel application, a thread's transaction may need to access an object residing in a locale owned by another thread, which may be referred to herein as a foreign locale. In some embodiments, foreign locales may be accessed by looking up information about various locales in a globally shared table of locales (e.g., an indexed table of locale information that maps address ranges to locales). In some embodiments, each data object in a shared memory may contain a back-pointer to the locale to which it belongs. In some embodiments, transactional accesses to objects in a foreign locale are done using traditional read/write fences. As previously noted, this may be incompatible with any concurrently executing optimized accesses of the foreign locale's owner transaction. This illustrates the motivation for the shared locale state, which in some embodiments grants a transaction the permission to safely access objects from a foreign locale. In some embodiments, a transaction may simply need to ensure that any foreign locale it is about to access is in the shared state. As discussed herein, this may be implemented in various ways including, but not limited to, by employing shared counters, reader-writer locks, non-zero indicators, etc.

In some embodiments, a transaction may switch a foreign locale's state from free to shared, or from exclusive to shared. In the former case, the transaction making the switch may not need to do anything else. In the latter case, the foreign locale's owner transaction T, which may be currently using optimized read/write fences for its locale accesses, must detect this state change, and must ensure that its subsequent accesses to the foreign locale (i.e. its own locale) employ the traditional STM read/write fences described herein. Thereafter, T acts like any other transaction and participates in maintaining the shared state of the locale (via manipulations to the data structures that indicate whether it is time to switch to free state). Note that if a transaction T's locale was already in the shared state before T began executing, all of T's accesses to its locale may be mediated through traditional STM read/write fences. Note also that the lack of this specific operation (i.e. shared state "maintenance") in the disabled state is a key difference between the shared state and the disabled state.

Figure 7:
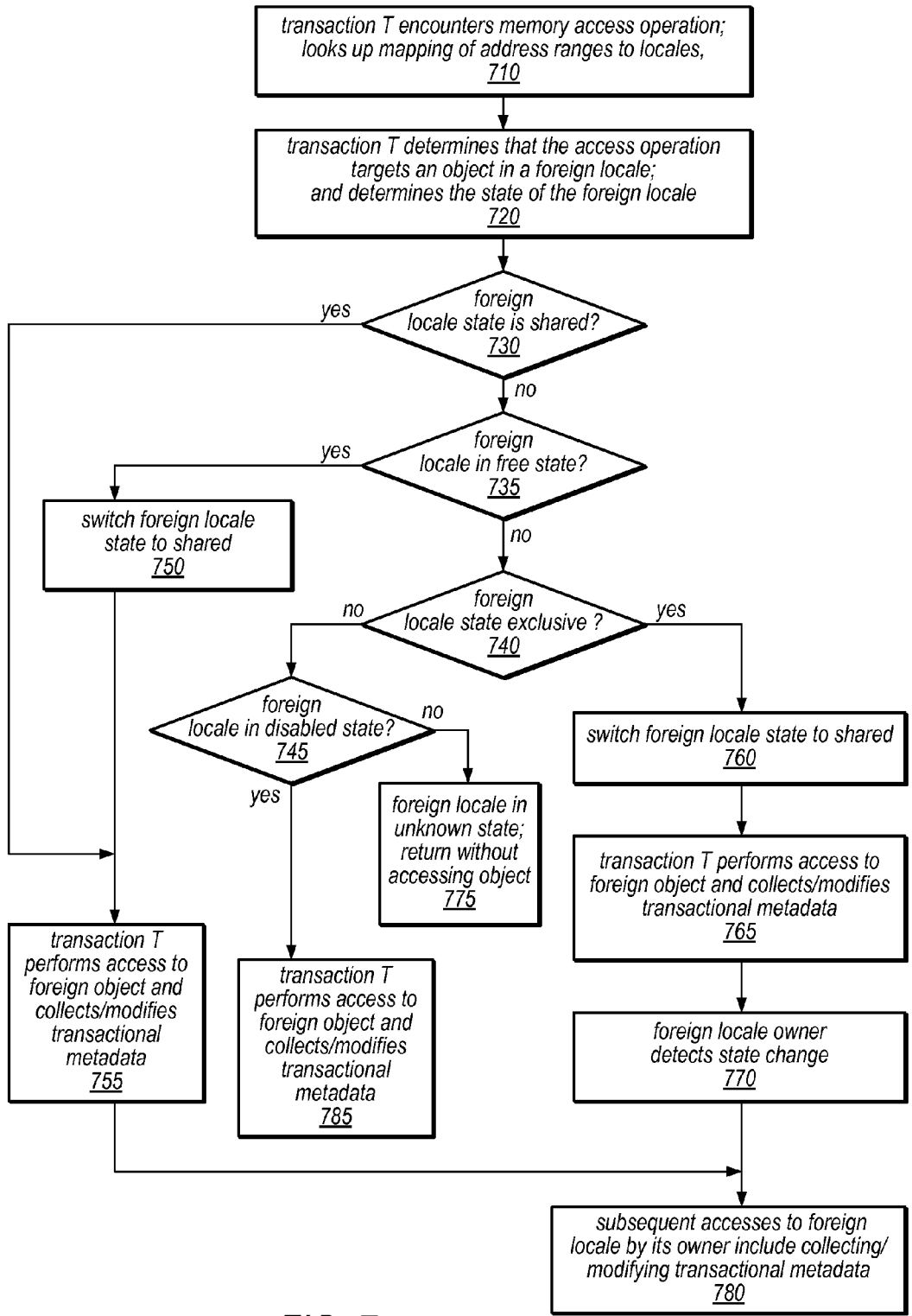
FIG. 7 is a flow diagram illustrating one embodiment of a method for accessing an object in a foreign locale, as described herein.

A method for accessing an object in a foreign locale is illustrated in FIG. 7, according to one embodiment. In this example, the method includes a transaction T encountering a memory access operation, as in 710, and determining that the access operation targets an object in a foreign locale (i.e. a locale that is not owned by transaction T and/or that is owned by another transaction), as in 720. As illustrated in this example, the method may include determining the state of the foreign locale, which may include examining a locale guard associated with the foreign locale to determine its value, which may indicate the state of the foreign locale. If the foreign locale is in the shared state, shown as the positive exit from 730, the method may include transaction T performing the access to the foreign object, and collecting and/or modifying transactional metadata, as in 755. As illustrated in FIG. 7, the method may also include the foreign locale's owner performing subsequent accesses to the foreign locale in the same manner (i.e. including collecting and/or modifying transactional metadata), as in 780.

Figure 8:
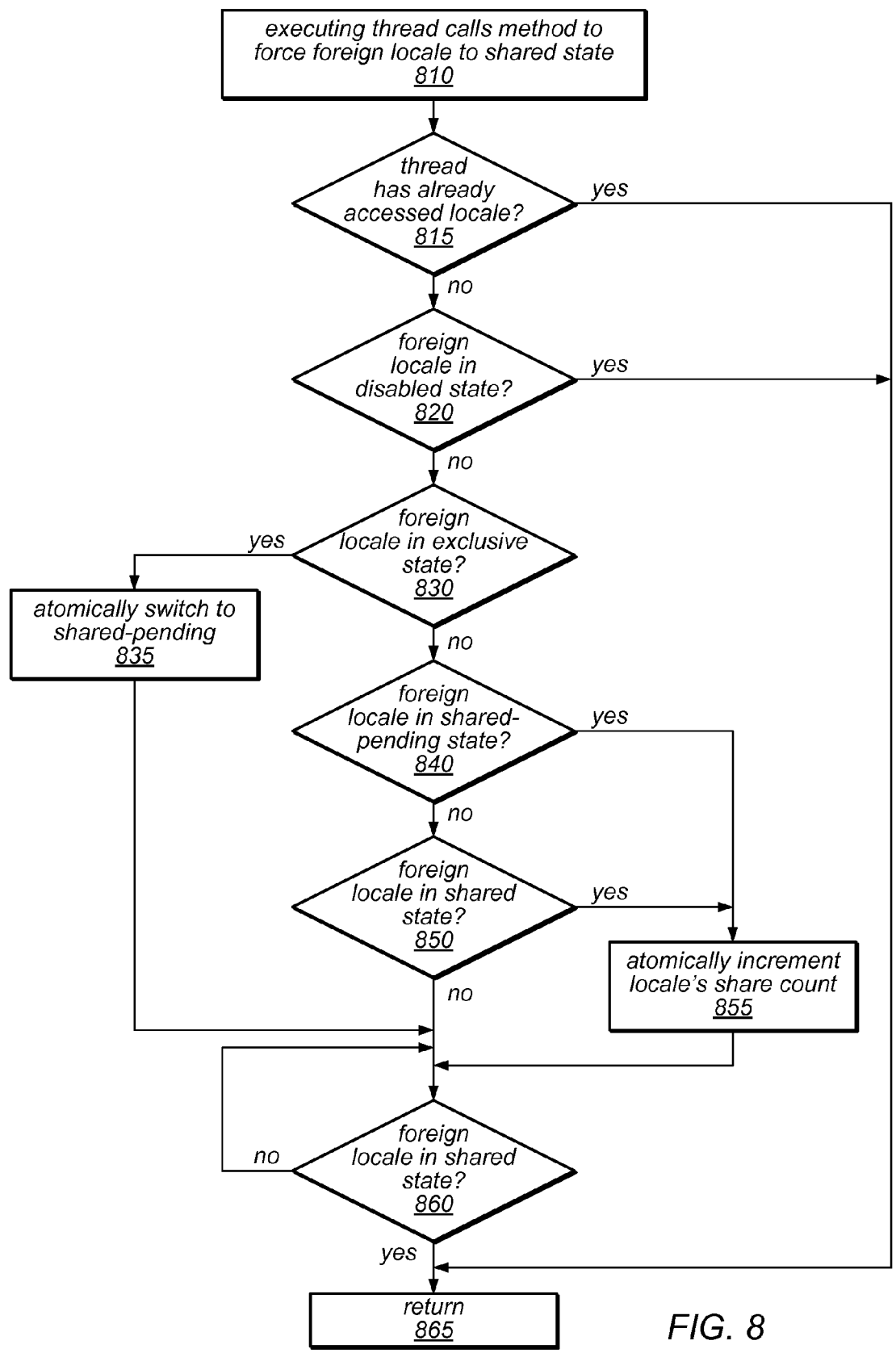
FIG. 8 is a flow diagram illustrating one embodiment of a method by which an executing thread can force a foreign locale to the shared state, as described herein.

As illustrated in this example, if the foreign locale is in the free state, shown as the positive exit from 735, the method may include switching the foreign locale's state to shared before attempting to access the object, as in 750. As described herein, in some embodiments, any transaction can switch a locale from the free state to the shared state, e.g., by modifying the value of the locale guard associated with the locale. One method for forcing a foreign locale to the shared state is illustrated in FIG. 8 and described in more detail below. Once the foreign locale is in the shared state, the method may include transaction T performing the access to the foreign object, and collecting and/or modifying transactional metadata, as in 755, and may also include the foreign locale's owner performing subsequent accesses to the foreign locale in the same manner (i.e. including collecting and/or modifying transactional metadata), as in 780.

As illustrated in FIG. 7, if the foreign locale is in the exclusive state, shown as the positive exit from 740, the method may include switching the foreign locale's state to shared before attempting to access the object, as in 760. As noted above, in some embodiments, switching the state of a locale from exclusive to shared may include first switching it to the shared-pending state. Once the foreign locale is in the shared state, the method may include transaction T performing the access to the foreign object, and collecting and/or modifying transactional metadata, as in 765. However, in this case, the method may also include the owner transaction of the foreign locale detecting the state change of the foreign locale (as in 770) and modifying how it accesses the foreign locale subsequent to the state change. In other words, even though previous accesses to objects residing in the foreign locale by its owner transaction may not have included the collecting or modifying of transactional metadata, accesses to objects in the foreign locale by its owner may include the collecting and/or modifying transactional metadata), as in 780.

In the example illustrated in FIG. 7, if the foreign locale is not in the shared state, the free state, or the exclusive state, but is in the disabled state, shown as the positive exit from 745, the method may include transaction T performing the access to the foreign object, and collecting and/or modifying transactional metadata, as in 785. If the foreign locale is not in the disabled state, shown as the negative exit from 745, it may be in an unknown state. In some embodiments, if the foreign locale is in an unknown state (or if transaction T is unable to determine that the foreign locale is in a valid state), the method may include returning to the caller without transaction T accessing the object in the foreign locale at all, as in 775. In other embodiments, this case may be handled differently. For example, in some embodiments, if the foreign locale is not in the shared, free, exclusive, or disabled states, the method may include transaction T trying again to determine the state of the foreign locale by repeating the operations illustrated in FIG. 7 beginning at element 730 until it is determined that the foreign locale is in one of these valid states. In one such embodiment, if the foreign locale is not in the shared, free, exclusive, or disabled states, it may be in a shared-pending state (as described herein). In this example, the method may include transaction T repeating the operations illustrated in FIG. 7 beginning at element 730 until it is determined that the foreign locale has been switched from the shared-pending state to the shared state, or has been switched to another valid state (e.g., a free, disabled, or exclusive state).

In some embodiments, the owner transaction T of an exclusive locale l, may not immediately detect that l has been switched to the shared state by a concurrently executing transaction. In some embodiments, the concurrently executing transactions that intend to access l may communicate their intent to transaction T. This can be done in various ways, according to different embodiments. For example, in some embodiments, the concurrently executing transactions may switch l to the shared-pending state. In such embodiments, the transactions may thereafter wait for l to switch to the shared state before accessing objects residing in l. In this example, transaction T may be the only transaction that can switch l from the shared-pending state to the shared state. This switch may in some embodiments act as an acknowledgement to concurrently executing transactions to continue (or proceed) to access objects in locale l. The locale state (as reflected by the value stored in the corresponding lguard) may in some embodiments be augmented with a share count that indicates the number of transactions that have requested shared access to the locale. Such share counts may be implemented in various ways including, but not limited to, through the use of shared counters, reader-writer locks, and non-zero indicators, and the concurrently executing transactions may update such a shared counter (or indicator) data structure if and when they intend to access an object in locale l. When the share count is zero, the owner of the locale can switch it back to the exclusive state.

A method by which an executing thread can force a foreign locale (i.e. one not owned by that executing thread) to the shared state is illustrated in FIG. 8, according to one embodiment. As illustrated at 810 in this example, the method may be called by any executing thread. As previously noted, in some embodiments, only an owner thread can transition a locale in the exclusive state to the shared state (e.g., by modifying the value if its corresponding locale guard), but any thread can transition an exclusive lguard to a shared-pending state. In this example, if the calling thread has already accessed the foreign locale, shown as the positive exit from 815, the lguard must already be in the shared state. Therefore, the method may simply return to the caller, as in 865. If the calling thread has not already accessed the foreign locale, shown as the negative exit from 815, the method may include different operations, depending on the current state of the locale, as reflected by the value of its associated lguard. As illustrated in this example, if the foreign locale is in the disabled state, shown as the positive exit from 820, this indicates that locale-based optimizations for the foreign locale are disabled. As noted above, in some embodiments only the owner thread can enable the locale-based optimizations described herein. In such embodiments, another thread (e.g., the calling thread) cannot transition a foreign locale out of the disabled state. In the example illustrated in FIG. 8, if the foreign locale is in the disabled state, the method may simply return (as in 865), without forcing the foreign locale to the shared state. This is because there may be no need to force the foreign locale to the shared state. In this case, the transaction may simply access objects in the foreign locale using STM read/write fences.

As illustrated in FIG. 8, if the foreign locale is in the exclusive state, shown as the positive exit from 830, the method may include atomically switching the state of the foreign locale to the shared-pending state (e.g., by modifying the value of its associated lguard), as in 835. As previously noted, in some embodiments only a locale's owner can transition its associated lguard from shared-pending to the shared state. It may thus be up to the owner thread of the foreign locale to recognize the state change made by other thread, and to transition the foreign locale to the shared state at some point in the future. As illustrated in this example, the calling thread may not be able to continue with a pending access to the foreign locale, but may need to wait until the owner of the foreign locale has transitioned it from the shared-pending state to the shared state. This is illustrated in FIG. 8 as the feedback loop from the negative exit of 860 to the input of 860. Once the transition to the shared state has taken place, shown as the positive exit from 860, the method may return to the caller, as in 865.

As illustrated in this example, if the foreign locale is in the shared-pending state, shown as the positive exit from 840, the method may include atomically incrementing the foreign locale's share count, as in 855, and waiting for this transition to occur before continuing, as in 860 and its feedback loop. As described herein, the value of a data structure storing a share count for a locale may reflect the number of threads (other than the owner thread) wanting to access the foreign locale in the shared state. If the foreign locale is already in the shared state, shown as the positive exit from 850, the method may include atomically incrementing the share count, as in 855, and checking again that the foreign locale is still in the shared state (in 860) before returning to the caller (as in 865). Note that, in some embodiments, when a transaction that requested shared access to a locale and that incremented the locale's share counts completes (e.g., commits or aborts), the method may include decrementing the locale's share count (not shown).

A method that may be used by a transaction to transition the state of a foreign locale from the exclusive state to the shared state, via the shared-pending state, is further illustrated by the example pseudo code below, according to one embodiment.

```
forceLocaleToShared(Locale foreignLocale, Transaction t)
    // check if t has previously accessed foreign Locale
    if (alreadyAccessed(t, foreignLocale))
        // this means that foreign locale must be in Shared
        // state, so simply return
        return
    while (true)
    do
        if (foreignLocale.isDisabled( ))
            // foreign locale is disabled, so simply return
            return
        if (foreignLocale.isExclusive( ))
            // atomically change locale state to SharedPending
            if (CAS(foreignLocale.state, <Exclusive,0>,
                                         <SharedPending,1>)
                // exit while loop
                break;
        if (foreignLocale.isSharedPending( ))
            // atomically increment share count of the locale
            if (CAS(foreignLocale.state, <SharedPending, shareCount>,
                                         <SharedPending,shareCount+1>)
                // exit while loop
                break;
        if (foreignLocale.isShared( ))
            // atomically increment share count of the locale
            if (CAS(foreignLocale.state, <Shared,shareCount>,
                                         <Shared,shareCount+1>)
                // exit while loop
                break;
    enddo
    // foreign locale is in Shared or SharedPending state
    // make sure that the locale is in Shared state
    while (!foreignLocale.isShared( ))
    do
        // empty while loop
    enddo
    // now the foreign locale is in the Shared state; return
    return
```

In some embodiments, after the owner transaction of an exclusive locale commits, it may switch the locale's state to free. Similarly, after the last transaction accessing a shared locale commits, it may switch the locale to the free state, in some embodiments. In other embodiments, the transaction may (at least in some cases) choose to keep the locale in the exclusive state to eliminate extra state transitions. For example, in some cases it may be rare that a locale switches to the shared state. Therefore, the system may be configured to keep it in the exclusive state until a concurrently executing transaction requests shared access to the locale. Note that in some embodiments, a thread may maintain a history of its locale's state transitions to determine if the locale was accessed predominantly in the exclusive state or in a shared state. If the former, future transactions executed by the owner thread may continue to use the exclusive state based read/write fence optimizations until or unless shared access is requested. If the latter, subsequently executed transactions may be configured to switch the locale to the disabled state once they complete.

In many applications, an object may be repeatedly accessed by a computation (e.g., a transaction). In embodiments in which the compiler can detect this, the compiler may be configured to eliminate redundant expression evaluations from the computation. For example, some prior STMs have employed compiler optimizations to eliminate redundant ownership acquisition operations. In some embodiments, such optimizations may be leveraged to eliminate redundant locale membership tests on objects that are repeatedly accessed within the same transaction.

As described herein, an optimized read fence may force a transaction T to check its locale l's state after every object read within l. This may enable T to precisely determine the time at which a concurrently executing transaction begins to write into l. This information may be important for determining consistency of STM transactions in applications written in unmanaged languages such as C and C++. However, managed languages such as Java and C# can tolerate intermediate inconsistencies. Thus, systems supporting such languages may permit T to elide l's state check after each read from l. In some such embodiments, T may have to check l's state only as a part of its commit-time validation phase. This may significantly reduce the number of locale state checks performed in transactions that predominantly access objects from their locales. Note that delayed validation of a transaction that is doomed to abort may in certain cases lead to wasted effort. As a result, in some embodiments, the system may be configured to validate the transaction at intermediate points in its execution. Thus, in some embodiments the system may permit or even direct occasional locale state checks during the execution of a transaction, the frequency of which may vary by application.

As described above, in redo log based write set implementations, the transaction's speculative writes may be logged in the transaction's write set. These writes may then be flushed out to the shared memory (through a write-back operation) only after the transaction logically commits (e.g., by switching its state to Committed). In some embodiments, the system and methods described herein may take advantage of this observation to elide the ownership acquisition step of write fences using a new "exclusive-locked" state for thread locales. In some embodiments, if a locale l is in this exclusive-locked state, no non-owner transaction of l can access an object from l. In such embodiments, a transaction can transition its locale to the exclusive-locked state only from the exclusive state (e.g., using an atomic instruction like compare-and-swap). Furthermore, to transition its locale to the exclusive-locked state, the transaction may first be required to logically commit. Intuitively, this exclusive-locked state exclusively locks the transaction's locale for the owner transaction, providing a lightweight ownership acquisition operation for all objects in the owner's locale. The owner may then flush out its speculative updates (which reside in the transaction's write set) to its locale. Thereafter, the owner may switch its locale's state to free.

The exclusive-locked locale state may enable a transaction to elide all write ownership acquisition operations in writes to its locale, which may provide a significant performance improvement for some applications. However, these improvements may come at the cost of reduced concurrency in that no transaction (other than the owner) may be permitted to access any object in the exclusive-locked locale. However, in parallel applications with well-partitioned locales, this compromise in concurrency may not result in a performance bottleneck. In some embodiments, the runtime system may keep track of contention levels on locales (e.g., using techniques such as augmenting each locale's state field with a contention counter) to detect potential bottlenecks introduced by the exclusive-locked state of a locale. In some embodiments, locales exhibiting high contention levels may not be allowed to transition to the exclusive-locked state.

Note that the exclusive-locked state essentially acts as a mutual exclusion lock. Fine grain locks are notorious for being prone to deadlocks, in which concurrently executing threads wait on each other indefinitely. In some embodiments, this problem may be avoided by requiring that a transaction T always switches its locale to the exclusive-locked state after acquiring ownership of all objects in its write set belonging to foreign locales. This may serve to enforce the guarantee that there will not be any waiting cycles between two transactions that own locales in an exclusive-locked state, and hence there can be no deadlocks.

In some embodiments, a transaction can switch its locale directly from the free state to the exclusive-locked state when it begins execution. This approach may eliminate the overhead encountered by a transition transitioning from the free state to exclusive state. However, this approach may serve to lock out an exclusively locked locale for a longer period of time (e.g., for the duration of the execution of a transaction rather than just the transaction's commit phase), which may make this approach even more susceptible to contention. In some embodiments, this problem may be eliminated by tracking contention levels on the locale, and disabling the aggressive exclusive locking of any highly contended locale(s). In some embodiments, deadlock may be avoided by conservatively aborting a transaction that has exclusively locked its locale whenever it needs to access an object from a foreign exclusive-locked locale. In some embodiments, the runtime system may employ various deadlock detection strategies to detect a deadlock and abort participating transactions.

In some embodiments, an optimization based on the exclusive-locked locale state may be applied in undo log based write set implementations, in which a transaction's speculative writes go directly to the shared memory. In such embodiments, to enable ownership acquisition elision for these writes, the transaction may first switch its locale to the exclusive-locked state. As long as the transaction continues to access objects in its locale, it will make unhindered forward progress. However, if the transaction happens to access an object from a foreign locale, and if that locale is in the exclusive-locked state, the system may end up in a deadlock. This situation may be avoided by conservatively aborting such transactions. During the re-execution of such a transaction, the runtime system may ensure that the transaction's locale is not switched to the exclusive-locked state for the re-execution (since the transaction is likely to access the same set of objects the next time around).

Note that in some embodiments, if the compiler or runtime system determines that a transaction will access objects only from its own locale, the transaction may elide even the write set logging operations and write directly to its locale's objects. As before, the transaction must carefully coordinate with concurrently executing transactions to ensure that such aggressive behavior does not result in a scalability bottleneck.

Software-hardware hybrid transactional memory (HyTM) implementations may overlay hardware transactional memory (HTM) infrastructure on an underlying STM implementation. A common approach is to leverage the hardware of the HTM to accelerate execution of the STM code path. This approach may significantly improve performance over pure software transactions. Of the various HyTM implementation approaches proposed so far, the approaches that leverage what is now known as best-effort hardware transactions may be the most practical ones. In such implementations, the underlying processor architecture may provide support for transactions that require few compute and memory resources (e.g., the write set size may be limited to the store buffer size, division instructions may not be supported, traps may not be permitted, etc.). If the transaction cannot be executed with the limited hardware resources, it may instead be executed entirely in software. This approach assumes that most transactions written by programmers will be small, and that they can thus be efficiently executed in hardware. In these systems, the more expensive software transactions are executed only for the minority of (much larger) transactions.

Two approaches to executing best-effort hardware transactions have been suggested in the past:

(i) The phased approach (PhTM), in which the system switches between hardware-only and software-only phases. In such systems, the execution path of the hardware phase transactions may be quite different than the software transaction code path and the HTM transactions may not execute any STM metadata operations, except for the minimal operation of checking a globally shared "phase" flag (which may be implemented as a Boolean variable, or a software-transactions counter/indicator), which indicates the current phase of the system. In a PhTM implementation, when a thread decides to execute a software transaction, it must guarantee that the system switches to the software phase (by modifying the globally shared phase flag, which in turn aborts all concurrent hardware transactions) before the thread begins executing the software transaction. To switch back to the hardware phase, a thread must guarantee that there are no concurrent software transactions in the system.

(ii) The hardware-software hybrid approach (HyTM), in which the hardware transaction execution path must at least read the STM metadata to ensure that no concurrently executing software transaction is simultaneously accessing the same data.

The locale-based optimizations described herein may interact with such hybrid systems in a manner similar to the manner in which they interact with STM systems (as described herein). Furthermore, in some embodiments, locales and locale-based information may interact with hybrid transactions in some more useful ways. For example, in PhTM systems, a single long running transaction may force the system to remain in the software phase, thereby forcing all concurrently executing transactions to run in software mode. This may be true even when the long running software transaction has no real overlap with any concurrently executing transactions. This form of cascading effect, in which one transaction forces the entire system to execute in a slow software phase, may significantly burden the performance of the concurrent TM application. A similar form of cascade-to-software-mode may occur in applications in which only a handful of transactions contend on a specific set of shared objects, and are forced to run in software mode to guarantee forward progress. In this case, other concurrent transactions may also be forced into software mode even if they do not access the hotly contended objects.

The locale-based partitioning described herein may in some embodiments be leveraged to alleviate these problems. For example, in some embodiments a phase indicator (e.g., a phase flag) may be associated with each locale (e.g., it may be added to the locale guard), and may enable the locales to independently switch between hardware and software phases. In such embodiments, a software transaction may ensure that only those locales it has accessed are in the software phase. In this example, no other locales may need to be in the software phase, and hence may not be subjected to the overhead of running in software mode when unnecessary. This observation may in some embodiments enable another optimization in managed language environments, i.e. that objects typically accessed by software transactions can be clustered together in a globally shared locale that always remains in the disabled state. In such embodiments, this set of objects may be determined in a managed language environment with some runtime profiling and then relocated into a shared locale during garbage collection cycles. Note also that in some embodiments, transactions accessing locales in a hardware phase may elide all of the transactional metadata management operations normally associated with memory access operations (e.g., those of traditional read/write fences).

Note that in some embodiments, if a processor architecture permits it, a transaction can access multiple locales in disparate phases. Each locale access must adhere to the read/write fence protocol dictated by the locale's state (e.g., exclusive, shared, etc.) and its phase (e.g., hardware or software). In order to take effect, such transactions may follow a carefully crafted commit protocol. For example, the transaction may need to ensure that all the objects in the shared software-phase locales that it has written to are acquired (per the object acquisition protocol of the STM runtime for each locale), and that its exclusive locale (if in that state) is switched to exclusive-locked state. In this case, the transaction can commit, causing writes to target locales in hardware phase to be flushed out by the hardware, and the writes to target locales in software phase to be flushed out explicitly by the software. Thereafter, any software ownerships may be released by the transaction.

Figure 9:
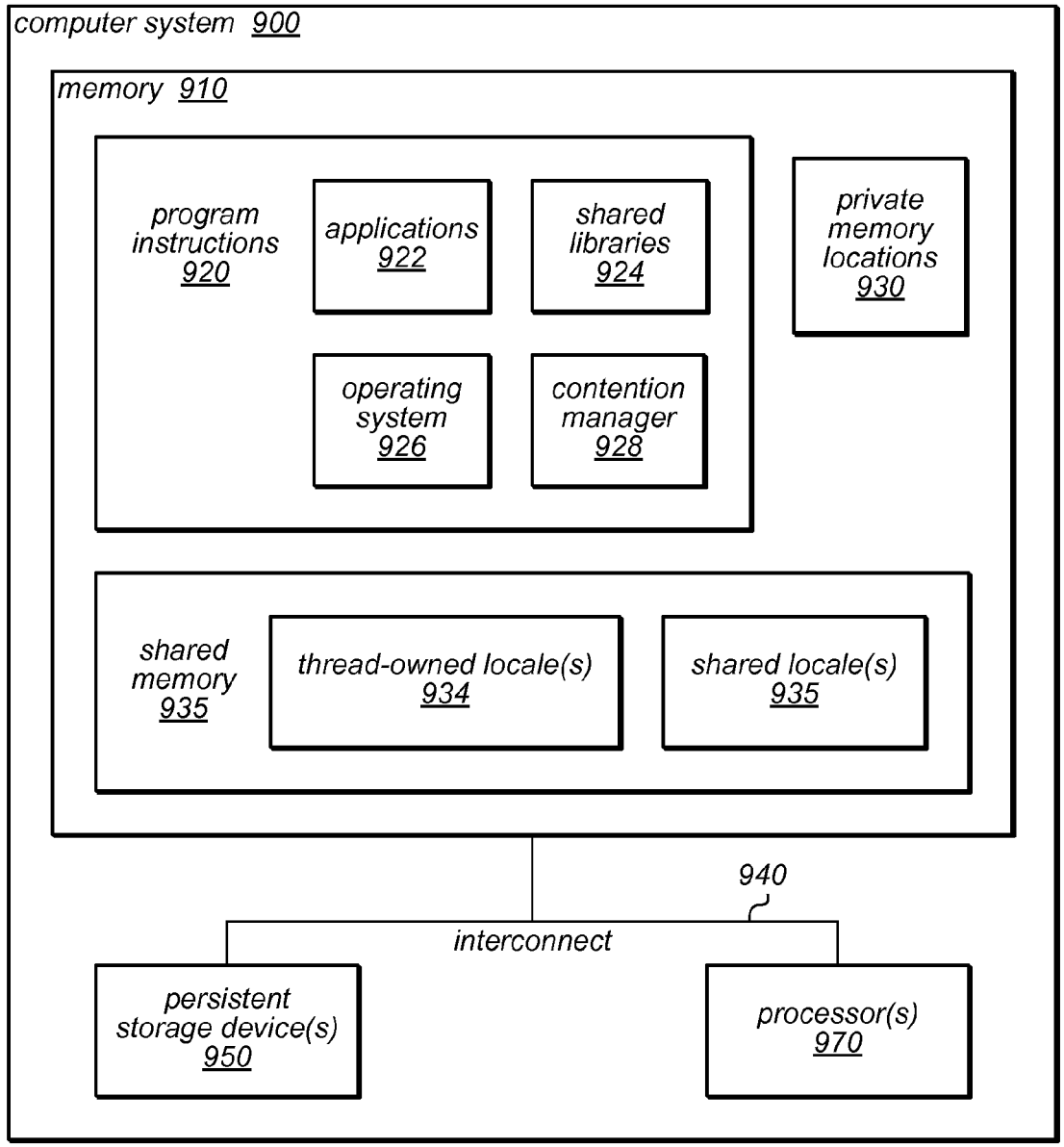
FIG. 9 is a block diagram illustrating a computer system configured to implement a transactional memory, according to various embodiments.

FIG. 9 illustrates a computing system configured to implement the methods described herein, according to various embodiments. The computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The mechanisms for providing transactional memory and the locale-based optimizations thereof described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

A computer system 900 may include one or more processors 970; each may include multiple cores, any of which may be single or multi-threaded. The computer system 900 may also include one or more persistent storage devices 950 (e.g. optical storage, magnetic storage, hard drive, tape drive, solid state memory, etc) and one or more memories 910 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.)

The one or more processors 970, the storage device(s) 950, and the system memory 910 may be coupled to the system interconnect 940. One or more of the system memories 910 may contain program instructions 920. Program instructions 920 may be executable to implement one or more applications 922, shared libraries 924, operating systems 926, or contention managers 928, as described herein. Program instructions 820 may be encoded in platform native binary, any interpreted language such as Java™ byte-code, or in any other language such as C/C++, Java™, etc or in any combination thereof. The program instructions 920 may include transactional memory support configured to provide functions, operations and/or other processes for implementing locale-based transactional memory access optimizations, as described herein. Such support and functions may exist in one or more of the shared libraries 924, operating systems 826, contention managers 928, or applications 922, in various embodiments. The system memory may further comprise private memory locations 930 and/or shared memory locations 935 where data may be stored. For example, these locations may store data in various data structures including, but not limited to, one or more locale guards, one or more share counters, one or more ownership records, one or more read ownership arrays, one or more thread-local read-write conflict indicators, a global read-write conflict counter, one or more data structures configured to store metadata (e.g., snapshots) associated with read access operations (i.e. a read set or invisible reads subset thereof), and/or other data structures accessible to a plurality of concurrently executing threads, processes, or transactions, in various embodiments. As illustrated in FIG. 9, shared memory 935 may include one or more add thread-owned locale(s) 934 and/or shared locale(s) 935, in various embodiments.

Although the embodiments above have been described in considerable detail, numerous variations and modifications will become apparent to those skilled in the art once the above disclosure is fully appreciated. For example, although many of the embodiments are described in terms of software transactional memory systems, it should be noted that the techniques and mechanisms disclosed herein may be applicable in other contexts in which software transactions are used, including hybrid hardware-software transactional memory systems. It is intended that the following claims be interpreted to embrace all such variations and modifications.

What is claimed:

1. A method, comprising:
  using a computer to perform:
    executing program instructions comprising code to be completed as an atomic transaction, wherein the code comprises one or more memory access operations to a shared memory that is accessible to a plurality of concurrently executing transactions, wherein the shared memory comprises a plurality of data partitions at least some of which are owned by respective ones of the plurality of concurrently executing transactions, and wherein each data partition is associated with a respective locale guard comprising a value that indicates a state of the data partition;

wherein for a given memory access operation of the atomic transaction targeting an object in the shared memory, said executing the program instructions comprises:
  performing the given memory access operation using one of a plurality of contention mediation mechanisms, wherein selection of the one of the plurality of contention mediation mechanisms is dependent on the value indicating the state in the respective locale guard associated with the data partition in which the object resides in the shared memory.

2. The method of claim 1,
wherein in response to determining that the data partition is owned by the atomic transaction and that the value indicating the state in its respective locale guard indicates that the data partition is in an exclusive state, said executing the program instructions comprises performing the given memory access operation using a contention mediation mechanism that does not rely on collection or modification of transaction-related metadata in conjunction with the given memory access operation; and
wherein an exclusive state is a state indicating that a transaction that owns the data partition is the only transaction that is currently accessing the data partition.

3. The method of claim 2, further comprising:
determining that all of the memory access operations of the atomic transaction target respective objects in the data partition;
wherein in response to determining that all of the memory access operations of the atomic transaction target respective objects in the data partition, said executing the program instructions comprises performing all of the memory access operations of the atomic transaction using a contention mediation mechanism that does not rely on collection or modification of transaction-related metadata in conjunction with the memory access operations of the atomic transaction.

4. The method of claim 1, wherein in response to a transaction other than the atomic transaction indicating an intent to access an object in the data partition, said executing the program instructions further comprises transitioning the data partition from an exclusive state to a non-exclusive state.

5. The method of claim 1, wherein in response to determining that the data partition is owned by the atomic transaction and that the value indicating the state in its respective locale guard indicates that the data partition is in a non-exclusive state, said executing the program instructions comprises performing the given memory access operation using a contention mediation mechanism that relies on collection or modification of transaction-related metadata in conjunction with the given memory access operation.

6. The method of claim 5,
wherein in response to determining that the value indicating the state in its respective locale guard indicates that the data partition is in a free state or a disabled state, said executing the program instructions further comprises forcing the data partition to a shared state prior to performing the given memory access operation;
wherein a free state is a state in which no transactions are currently accessing the data partition, a disabled state is a state in which locale-based optimizations are disabled for the data partition, and a shared state is a state in which the data partition is accessible by one or more transactions that do not own the data partition.

7. The method of claim 5,
wherein the given memory access operation comprises a read operation, and wherein said executing the program instructions comprises:
  logging the read operation in a read set of the atomic transaction; and
  validating the read set of the atomic transaction.

8. The method of claim 5, wherein the transaction-related metadata comprises one or more of: an ownership record, a read set, a write set, or a conflict counter.

9. The method of claim 1,
wherein the given memory access operation comprises a write operation; and
wherein in response to determining that the data partition is owned by the atomic transaction and that the value indicating the state in its respective locale guard indicates that the data partition is in an exclusive state, said executing the program instructions comprises logging a value written by the write operation without acquiring ownership of the object.

10. The method of claim 1,
wherein in response to determining that the data partition is owned by a transaction other than the atomic transaction, said executing the program instructions comprises:
  performing the given memory access operation using a contention mediation mechanism that relies on collection or modification of transaction-related metadata in conjunction with the given memory access operation; and
  in response to determining that the value indicating the state in its respective locale guard indicates that the data partition is in a free state or a disabled state, forcing the data partition to a shared state prior to performing the given memory access operation.

11. The method of claim 1,
wherein the given memory access operation comprises a read operation; and
wherein in response to determining that the data partition is owned by the atomic transaction and that the value indicating the state in its respective locale guard indicates that the data partition is in an exclusive state, said executing the program instructions comprises:
  performing the given memory access operation and performing one or more other read access operations of the atomic transactions that target respective objects in the data partition without determining whether the state of the data partition has changed following the given memory access operation or following each of the one or more other read access operations; and
  determining whether the state of the data partition has changed only when validating the read access operations during an attempt to commit the atomic transaction.

12. The method of claim 1,
wherein the locale guard associated with the data partition comprises a phase indicator whose values indicates whether the atomic transaction is to be executed as a software transaction or as a hardware transaction;
wherein in response to determining that the value of the phase indicator indicates that the atomic transaction is to be executed as a hardware transaction, said executing the program instructions comprises performing the given memory access operation and one or more other memory access operations targeting respective objects in the data partition using a contention mediation mechanism that does not rely on collection or modification of transaction-related metadata in conjunction with the given memory access operation or the one or more other memory access operations.

13. A system comprising:
one or more processors; and
a memory coupled to the one or more processors and storing program instructions executable by the one or more processors to implement:
 a thread executing program instructions comprising code to be completed as an atomic transaction, wherein the code comprises one or more memory access operations to a shared memory that is accessible to a plurality of concurrently executing transactions, wherein the shared memory comprises a plurality of data partitions at least some of which are owned by respective ones of the plurality of concurrently executing transactions, and wherein each data partition is associated with a respective locale guard comprising a value that indicates a state of the data partition;
 wherein for a given memory access operation of the atomic transaction targeting an object in the shared memory, said executing the program instructions comprises:
  performing the given memory access operation using one of a plurality of contention mediation mechanisms, wherein selection of the one of the plurality of contention mediation mechanisms is dependent on the value indicating the state in the respective locale guard associated with the data partition in which the object resides in the shared memory.

14. The system of claim 13,
wherein in response to determining that the data partition is owned by the atomic transaction and that the value indicating the state in its respective locale guard indicates that the data partition is in an exclusive state, said executing the program instructions comprises performing the given memory access operation using a contention mediation mechanism that does not rely on collection or modification of transaction-related metadata in conjunction with the given memory access operation; and
wherein an exclusive state is a state indicating that a transaction that owns the data partition is the only transaction that is currently accessing the data partition.

15. The system of claim 13,
wherein the program instructions are further executable by the one or more processors to implement, in response to a transaction other than the atomic transaction indicating an intent to access an object in the data partition, transitioning the data partition from an exclusive state to a shared state or a shared-pending state.

16. The system of claim 13, wherein in response to determining that the data partition is owned by the atomic transaction and that the value indicating the state in its respective locale guard indicates that the data partition is not in an exclusive state, said executing the program instructions comprises performing the given memory access operation using a contention mediation mechanism that relies on collection or modification of transaction-related metadata in conjunction with the given memory access operation.

17. A computer-readable storage medium storing program instructions comprising code that when executed on one or more computers causes the one or more computers to implement an atomic transaction,
wherein the code comprises one or more memory access operations to a shared memory that is accessible to a plurality of concurrently executing transactions, wherein the shared memory comprises a plurality of data partitions at least some of which are owned by respective ones of the plurality of concurrently executing transactions, and wherein each data partition is associated with a respective locale guard comprising a value that indicates a state of the data partition;
wherein for a given memory access operation of the atomic transaction targeting an object in the shared memory, executing the code comprises performing the given memory access operation using one of a plurality of contention mediation mechanisms, wherein selection of the one of the plurality of contention mediation mechanisms is dependent on the value indicating the state in the respective locale guard associated with the data partition in which the object resides in the shared memory.

18. The storage medium of claim 17,
wherein when executed on the one or more computers, the program instructions further cause the one or more computers to perform, in response to a transaction other than the atomic transaction indicating an intent to access an object in the data partition, transitioning the data partition from an exclusive state to a non-exclusive state.

19. The storage medium of claim 17,
wherein in response to determining that the data partition is owned by the atomic transaction and that the value indicating the state in its respective locale guard indicates that the data partition is in an exclusive state, said executing the code comprises performing the given memory access operation using a contention mediation mechanism that does not rely on collection or modification of transaction-related metadata in conjunction with the given memory access operation; and
wherein an exclusive state is a state indicating that a transaction that owns the data partition is the only transaction that is currently accessing the data partition.

20. The storage medium of claim 17, wherein in response to determining that the data partition is owned by the atomic transaction and that the value indicating the state in its respective locale guard indicates that the data partition is not in an exclusive state, said executing the code comprises performing the given memory access operation using a contention mediation mechanism that relies on collection or modification of transaction-related metadata in conjunction with the given memory access operation.

* * * * *

UNITED STATES PATENT AND TRADEMARK OFFICE
CERTIFICATE OF CORRECTION

PATENT NO. : 8,417,897 B2  
APPLICATION NO. : 12/750884  
DATED : April 9, 2013  
INVENTOR(S) : Marathe et al.

Page 1 of 1

It is certified that error appears in the above-identified patent and that said Letters Patent is hereby corrected as shown below:

In the Specifications

In column 1, line 59, delete "succeed," and insert -- succeed), --, therefor.

In column 16, line 22, delete "acqire" and insert -- acquire --, therefor.

In column 23, line 27, delete "<SharedPending,1>)" and insert -- <SharedPending,1>)) --, therefor.

In column 23, line 31, delete "shareCount+1>)" and insert -- shareCount+1>)) --, therefor.

In column 23, line 36, delete "shareCount+1>)" and insert -- shareCount+1>)) --, therefor.

In column 25, line 19, after "a" delete "transition".

Signed and Sealed this  
Thirtieth Day of July, 2013

Teresa Stanek Rea  
*Acting Director of the United States Patent and Trademark Office*